(12) United States Patent
Trombley-Shapiro et al.

(10) Patent No.: US 9,015,601 B2
(45) Date of Patent: Apr. 21, 2015

(54) BATCH UPLOADING OF CONTENT TO A WEB-BASED COLLABORATION ENVIRONMENT

(75) Inventors: Benjamin Trombley-Shapiro, San Francisco, CA (US); James P. Lyons, Sunnyvale, CA (US); Arnold Goldberg, Los Altos, CA (US); Florian Jourda, San Francisco, CA (US); David T. Lee, Easter City, CA (US); Arshdeep Mand, Union City, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/165,725

(22) Filed: Jun. 21, 2011

(65) Prior Publication Data

US 2012/0331394 A1 Dec. 27, 2012

(51) Int. Cl.
| | | |
|---|---|---|
| G06F 3/00 | (2006.01) |
| G06F 9/48 | (2006.01) |
| G06Q 10/10 | (2012.01) |
| H04L 29/08 | (2006.01) |
| G06F 3/01 | (2006.01) |

(52) U.S. Cl.
CPC ........ *G06F 9/48* (2013.01); *G06Q 10/10* (2013.01); *H04L 67/06* (2013.01)

(58) Field of Classification Search
USPC .......................................... 715/748, 750, 751
See application file for complete search history.

(56) References Cited

U.S. PATENT DOCUMENTS

| | | |
|---|---|---|
| 5,799,320 A | 8/1998 | Klug |
| 5,848,415 A | 12/1998 | Guck |
| 5,999,908 A | 12/1999 | Abelow |
| 6,034,621 A | 3/2000 | Kaufman |
| 6,073,161 A | 6/2000 | DeBoskey et al. |
| 6,098,078 A | 8/2000 | Gehani et al. |
| 6,233,600 B1 | 5/2001 | Salas et al. |
| 6,289,345 B1 | 9/2001 | Yasue |
| 6,292,803 B1 | 9/2001 | Richardson et al. |
| 6,336,124 B1 | 1/2002 | Alam et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

International Search Report and Written Opinion for PCT/US2011/060875 Mailed Oct. 30, 2012, pp. 1-10.

(Continued)

*Primary Examiner* — Nicholas Augustine
(74) *Attorney, Agent, or Firm* — Perkins Coie LLP

(57) ABSTRACT

Systems and methods of batch uploading of content to a web-based collaboration environment are disclosed. In one aspect, embodiments of the present disclosure include a method, which may be implemented on a system, for receiving an upload request from a user through a user interface to upload multiple items and sequentially uploading each of the multiple items to the host server. In one embodiment, the user is able to navigate away from the user interface through which the upload request was submitted prior to completion of the uploading of each of the multiple items to the host server. In addition, the upload of the multiple items is not interrupted if the user accesses a link on the user interface causing another user interface to launch in a browser.

24 Claims, 28 Drawing Sheets

(56) References Cited

U.S. PATENT DOCUMENTS

| | | |
|---|---|---|
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,937,663 B2 | 5/2011 | Parker et al. |
| 7,958,453 B1 | 6/2011 | Taing |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,549,511 B2 | 10/2013 | Seki et al. |
| 8,607,306 B1 | 12/2013 | Bridge et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2003/0041095 A1 | 2/2003 | Konda |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |

(56) References Cited

U.S. PATENT DOCUMENTS

| | | |
|---|---|---|
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0193107 A1 | 7/2009 | Srinivasan et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1* | 8/2010 | Knighton et al. ............ 715/751 |
| 2010/0223378 A1 | 9/2010 | Wei |
| 2010/0229085 A1* | 9/2010 | Nelson et al. ............... 715/255 |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1* | 9/2010 | Spataro et al. ............... 715/753 |
| 2010/0250120 A1 | 9/2010 | Waupotitsch et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2010/0332401 A1 | 12/2010 | Prahlad et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | Van Der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1* | 7/2011 | Grosz et al. .................. 715/738 |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0238458 A1 | 9/2011 | Purcell et al. |
| 2011/0238621 A1 | 9/2011 | Agrawal |
| 2011/0239135 A1* | 9/2011 | Spataro et al. ............... 715/753 |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110436 A1 | 5/2012 | Adler, III et al. |
| 2012/0117626 A1 | 5/2012 | Yates et al. |
| 2012/0124547 A1 | 5/2012 | Halbedel |
| 2012/0130900 A1 | 5/2012 | Tang et al. |
| 2012/0134934 A1 | 5/2012 | Liu |
| 2012/0136936 A1 | 5/2012 | Quintuna |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0173625 A1 | 7/2012 | Berger |
| 2012/0179981 A1 | 7/2012 | Whalin et al. |
| 2012/0185355 A1 | 7/2012 | Kilroy |

(56) References Cited

U.S. PATENT DOCUMENTS

| | | | |
|---|---|---|---|
| 2012/0185913 A1 | 7/2012 | Martinez et al. | |
| 2012/0192055 A1 | 7/2012 | Antebi et al. | |
| 2012/0192086 A1 | 7/2012 | Ghods et al. | |
| 2012/0203908 A1 | 8/2012 | Beaty et al. | |
| 2012/0204032 A1 | 8/2012 | Wilkins et al. | |
| 2012/0214444 A1 | 8/2012 | McBride et al. | |
| 2012/0218885 A1 | 8/2012 | Abel et al. | |
| 2012/0226767 A1 | 9/2012 | Luna et al. | |
| 2012/0233155 A1 | 9/2012 | Gallmeier et al. | |
| 2012/0233205 A1* | 9/2012 | McDermott | 707/769 |
| 2012/0240061 A1* | 9/2012 | Hillenius et al. | 715/753 |
| 2012/0266203 A1 | 10/2012 | Elhadad et al. | |
| 2012/0284638 A1 | 11/2012 | Cutler et al. | |
| 2012/0284664 A1 | 11/2012 | Zhao | |
| 2012/0291011 A1 | 11/2012 | Quine | |
| 2012/0309540 A1 | 12/2012 | Holme et al. | |
| 2012/0317239 A1 | 12/2012 | Mulder et al. | |
| 2012/0317487 A1 | 12/2012 | Lieb et al. | |
| 2012/0328259 A1 | 12/2012 | Seibert, Jr. et al. | |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0013560 A1 | 1/2013 | Goldberg et al. | |
| 2013/0014023 A1 | 1/2013 | Lee et al. | |
| 2013/0042106 A1 | 2/2013 | Persaud et al. | |
| 2013/0055127 A1 | 2/2013 | Saito et al. | |
| 2013/0067232 A1 | 3/2013 | Cheung et al. | |
| 2013/0080919 A1 | 3/2013 | Kiang et al. | |
| 2013/0124638 A1 | 5/2013 | Barreto et al. | |
| 2013/0138608 A1 | 5/2013 | Smith | |
| 2013/0159411 A1 | 6/2013 | Bowen | |
| 2013/0163289 A1 | 6/2013 | Kim et al. | |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0246932 A1 | 9/2013 | Zaveri et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0305039 A1 | 11/2013 | Gauda | |
| 2014/0052939 A1 | 2/2014 | Tseng et al. | |
| 2014/0068589 A1 | 3/2014 | Barak | |

FOREIGN PATENT DOCUMENTS

| | | | |
|---|---|---|---|
| CN | 102264063 A | 11/2011 | |
| EP | 0921661 A2 | 6/1999 | |
| EP | 1528746 A2 | 5/2005 | |
| EP | 2372574 A1 | 10/2011 | |
| EP | 2610776 A2 | 7/2013 | |
| GB | 2453924 A | 4/2009 | |
| GB | 2471282 A | 12/2010 | |
| JP | 09-101937 | 4/1997 | |
| JP | 2003273912 A | 9/2003 | |
| JP | 2004310272 A | 11/2004 | |
| JP | 2008250944 | 10/2008 | |
| KR | 20020017444 A | 3/2002 | |
| KR | 20040028036 | 4/2004 | |
| KR | 20050017674 | 2/2005 | |
| KR | 20060070306 A | 6/2006 | |
| KR | 20060114871 A | 11/2006 | |
| KR | 20070043353 A | 4/2007 | |
| KR | 20070100477 A | 10/2007 | |
| KR | 20100118836 A | 11/2010 | |
| KR | 20110074096 A | 6/2011 | |
| KR | 20110076831 A | 7/2011 | |
| WO | WO-0219128 A1 | 3/2002 | |
| WO | WO-2004097681 | 11/2004 | |
| WO | WO-2006028850 A2 | 3/2006 | |
| WO | WO-2007024438 A1 | 3/2007 | |
| WO | WO-2007035637 A2 | 3/2007 | |
| WO | WO-2008011142 A2 | 1/2008 | |
| WO | WO-2008076520 A2 | 6/2008 | |
| WO | WO-2011109416 A2 | 9/2011 | |
| WO | WO-2012167272 A1 | 12/2012 | |
| WO | WO-2013009328 A2 | 1/2013 | |
| WO | WO-2013013217 A1 | 1/2013 | |
| WO | WO-2013041763 A1 | 3/2013 | |
| WO | WO-2013166520 | 11/2013 | |

OTHER PUBLICATIONS

Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
U.S. Appl. No. 13/030,090, filed Feb. 27, 2011, Ghods et al.
U.S. Appl. No. 13/152,982, filed Jun. 3, 2011, Ghods et al.
U.S. Appl. No. 13/166,733, filed Jun. 22, 2011, Seibert et al.
U.S. Appl. No. 13/208,615, filed Aug. 12, 2011, Lee et al.
International Search Report PCT/US2008/012973 dated Apr. 30, 2009, pp. 1-3.
Written Opinion PCT/US2008/012973 dated Apr. 30, 2009, pp. 1-4.
Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"Understanding Metadata," National Information Standards Organization, NISO Press, 2004, 20 pages.

(56) References Cited

OTHER PUBLICATIONS

International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312874.9, Applicant: Box, Inc. Mailed Dec. 20, 2013, 11 pages.
Exam Report for GB1314771.5, Applicant: Box, Inc. Mailed Feb. 17, 2014, 7 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Mar. 24, 2014, 7 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://syncenter.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"PaperPort Professional 14," PC Mag. Corn review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1312095.1, Applicant: Box, Inc. Mailed Dec. 12, 2013, 7 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for Ep 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.

(56) References Cited

OTHER PUBLICATIONS

Exam Report for GB1309209.3 Applicant: Box, Inc. Mailed Oct. 7, 2014, 3 pages.

Exam Report for GB1315232.7 Applicant: Box, Inc. Mailed Oct. 9, 2014, 5 pages.

Exam Report for GB1318789.3 Applicant: Box, Inc. Mailed Oct. 30, 2014, 6 pages.

Microsoft Windows Xp Professional Product Documentation: How Inheritance Affects File and Folder Permissions, Apr. 11, 2014, 2 pages.

* cited by examiner ically as a mechanism for project, task, and work flow management, as has the need and use of streamlined collaboration and editing surrounding digital content and documents. As multiple users are sharing and accessing content and files in the shared work space, uploading processes and mechanisms become a regularly accessed feature and is an integral component of the user's perception of system performance and ease of use.

BATCH UPLOADING OF CONTENT TO A WEB-BASED COLLABORATION ENVIRONMENT

CROSS REFERENCE TO RELATED APPLICATIONS

This application is related to U.S. patent application Ser. No. 13/152,982 entitled "Real Time Notification Of Activities that Occur In A Web-Based Collaboration Environment", which was filed on Jun. 3, 2011, the contents of which are all incorporated by reference herein.

BACKGROUND

As electronic or digital content is used in enterprise settings or other organizations as the preferred mechanism for project, task, and work flow management, as has the need and use of streamlined collaboration and editing surrounding digital content and documents. As multiple users are sharing and accessing content and files in the shared work space, uploading processes and mechanisms become a regularly accessed feature and is an integral component of the user's perception of system performance and ease of use.

DETAILED DESCRIPTION

Figure 1:
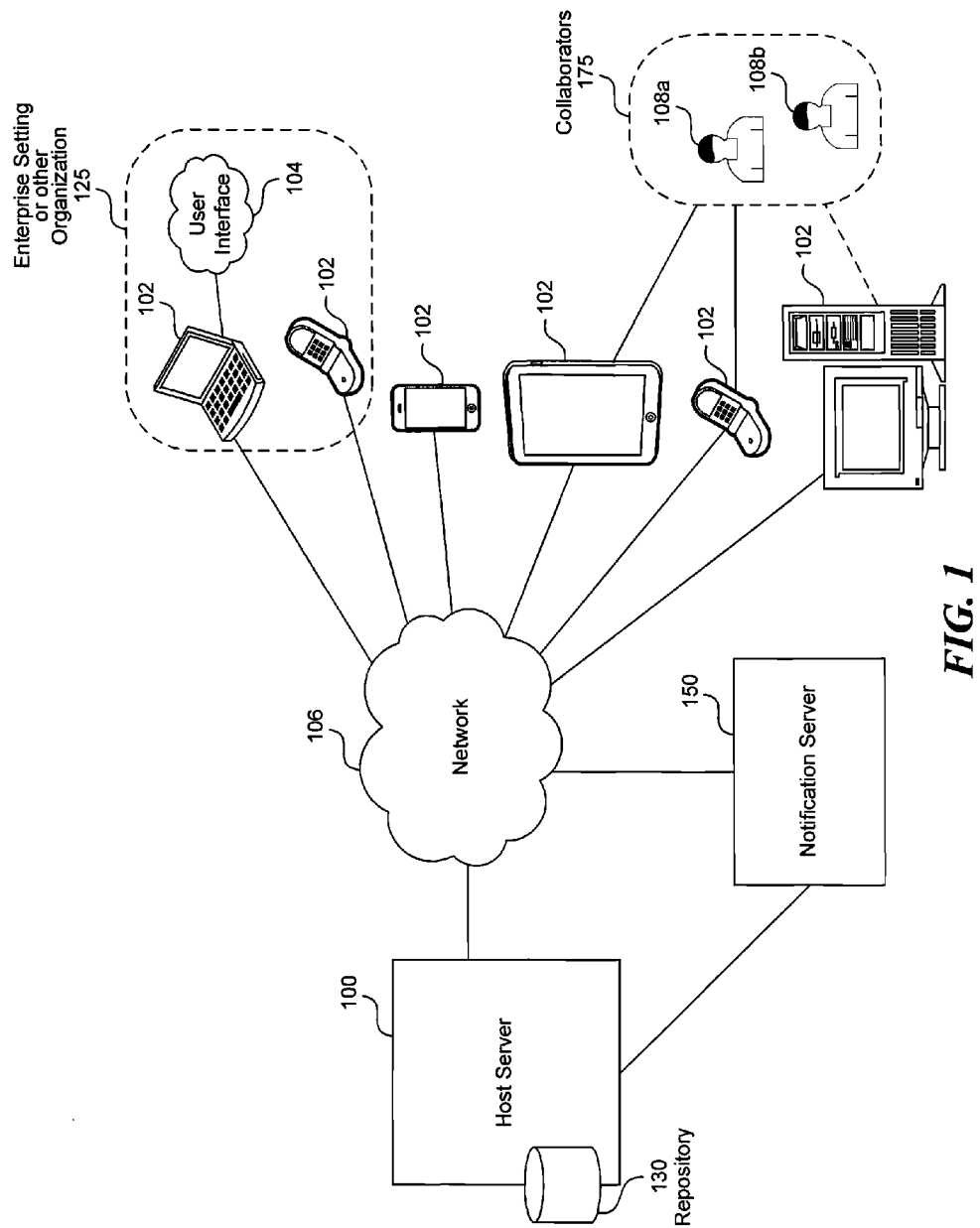
FIG. 1 illustrates an example diagram of a system having a host server able to batch upload content to an online collaboration environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods real time notification of activities that occur in a web-based collaboration environment.

FIG. 1 illustrates an example diagram of a system having a host server 100 able to batch upload content to an online collaboration environment.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
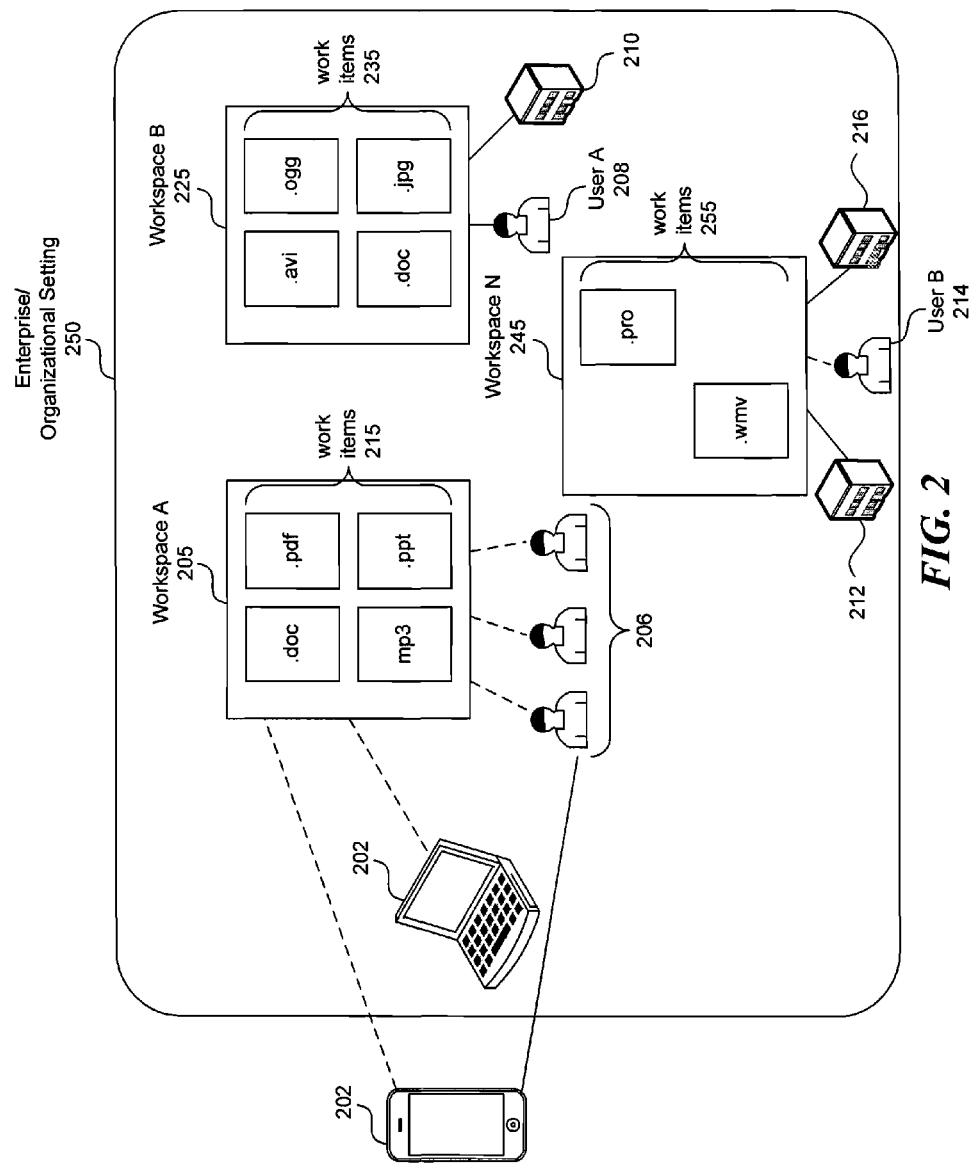
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of the online or web-based collaboration environment provides enhanced uploading mechanisms which allow for expedited uploading, and improved/enhanced user experience while uploads are in progress. For example, the user interface provides intuitive and efficient mechanisms for the user to upload multiple files or content in a hierarchy of folders to the collaboration environment. In some instances, the user may navigate away from an upload page when an upload is still in progress to work on other things, such as initiate other actions. In some instances an item of the multiple items that has finished uploading to the host server 100 can be made available for by the user even when other uploads of the same request are still in progress.

Functions and techniques disclosed for enhanced uploads and user experience improved/enhanced uploads are further described with reference to the components illustrated in the example of FIG. 4. Functions and techniques performed by the host server 100, the notification server 150, and the related components therein are described, respectively, in detail with further reference to the examples of FIG. 4-5.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content uploaded in accordance with the techniques described in the present disclosure can be cause notifications to be generated. Such notifications can be sent to relevant users to notify them of actions surrounding an upload, including by way of example but not limitation, an upload request, completion of the upload of a single file, of multiple files, or the completion of an upload request.

Example user interfaces for accessing the collaborative environment or platform to use upload related features are illustrated with references to the example screenshots of FIG. 9-27.

Figure 3:
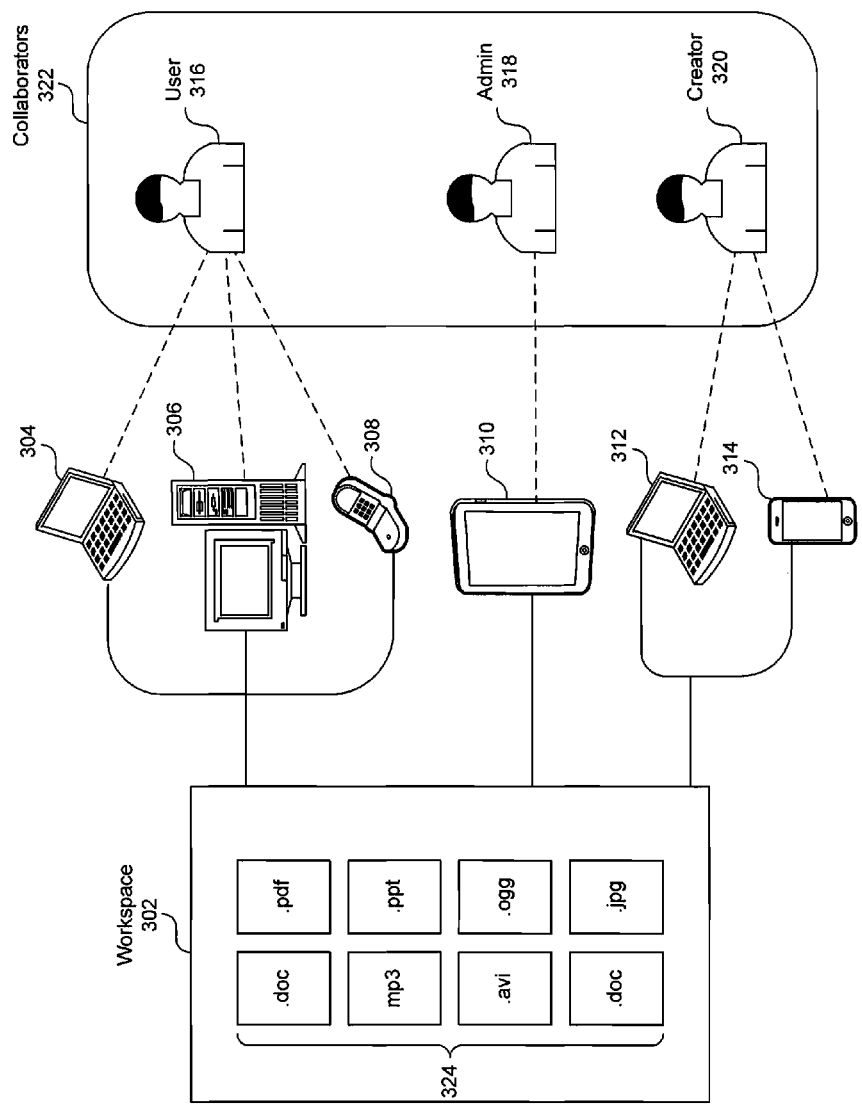
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items can be uploaded to the workspace 302 in accordance with the enhanced single file or multi-file upload mechanisms techniques disclosed herein, as further described with references to the examples of FIG. 4 and FIG. 6-8. Users can also be notified of upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform (e.g., as shown in the example screenshot of FIG. 8). In the event of multiple notifications, each notification can be depicted preferentially (e.g., ordering in the user interface) based on user preferences and/or relevance to the user (e.g., implicit or explicit).

For example, a notification of an upload or other upload related activities can be presented in a feed stream among other notifications through a user interface on the user device according to relevancy to the user determined based on current or recent activity of the user in the web-based collaboration environment. Preferential presentation of real time notifications is further described with references to the examples of FIG. 4 and the processes of FIG. 12-13.

Figure 4:
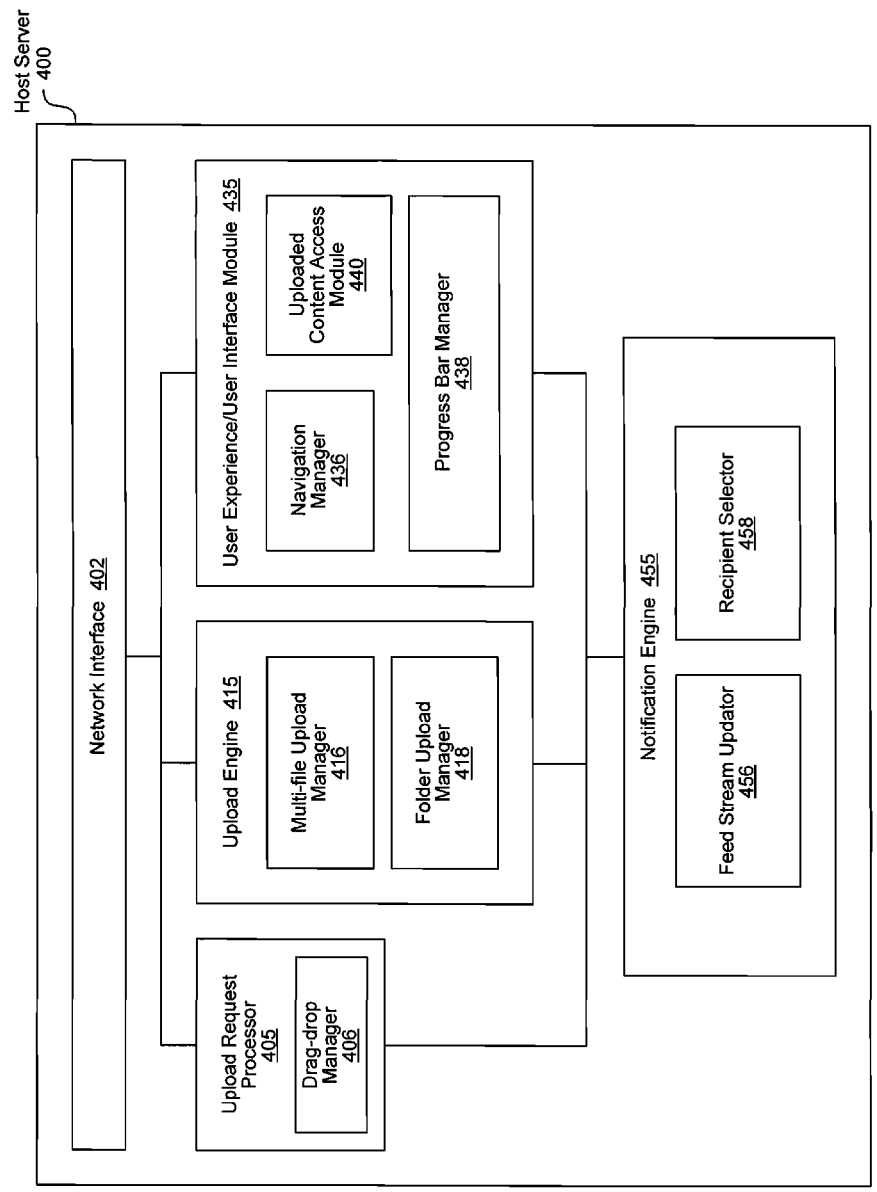
FIG. 4 depicts a block diagram illustrating an example of components in the host server of a web-based collaboration environment with streamlined batch uploading capabilities.

FIG. 4 depicts a block diagram illustrating an example of components in the host server 400 of a web-based collaboration environment with streamlined batch uploading capabilities.

The host server 400 of the web-based or online collaboration environment can generally be a cloud-based service. The host server 400 can include, for example, a network interface 402, an upload request processor 405 having a drop-drop manager 406, an upload engine 415 having a multi-file upload manager 416 and/or a folder upload manager 418, a user experience/user interface module 435 (or, "UE/UI module 435"). The UE/UI module 435 may further include a navigation manager 436, an upload content access module 440, and/or a progress bar manager 438. One embodiment, of the host server 400 further includes a notification engine 455 having, for example, a feed stream updator 456 and/or a recipient selector 458. Additional or less components/modules/engines can be included in the host server 400 and each illustrated component.

The network interface 402 can be a networking module that enables the host server 400 to mediate data in a network with an entity that is external to the host server 400, through any known and/or convenient communications protocol supported by the host and the external entity. The network interface 402 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," "a handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the activity detector upload request processor 405 which can receive, detect, process, identify, parse, translate, and/or determine an upload request. The upload request can be submitted from a user (e.g., through a user interface, such as that one shown in the examples of FIG. 9-10) to upload one or multiple items.

The user can identify the files, content, or items to be uploaded to the host server 400 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of the user interface, as shown in the example screenshot of FIG. 9-10. Drag-and-drop activated uploaded requests can be detected, handled, received, processed, and/or otherwise managed by the drag-drop manager 406.

In one embodiment, the upload request is generated via a drag-and-drop action of a single folder which includes the multiple work items to be uploaded to the host server 400. For example, the upload request can be generated when a folder having the multiple items on a client device that is to be uploaded is identified through the user interface. In some instances, the folder can include additional folders in a folder hierarchy of multiple items.

Figure 9:
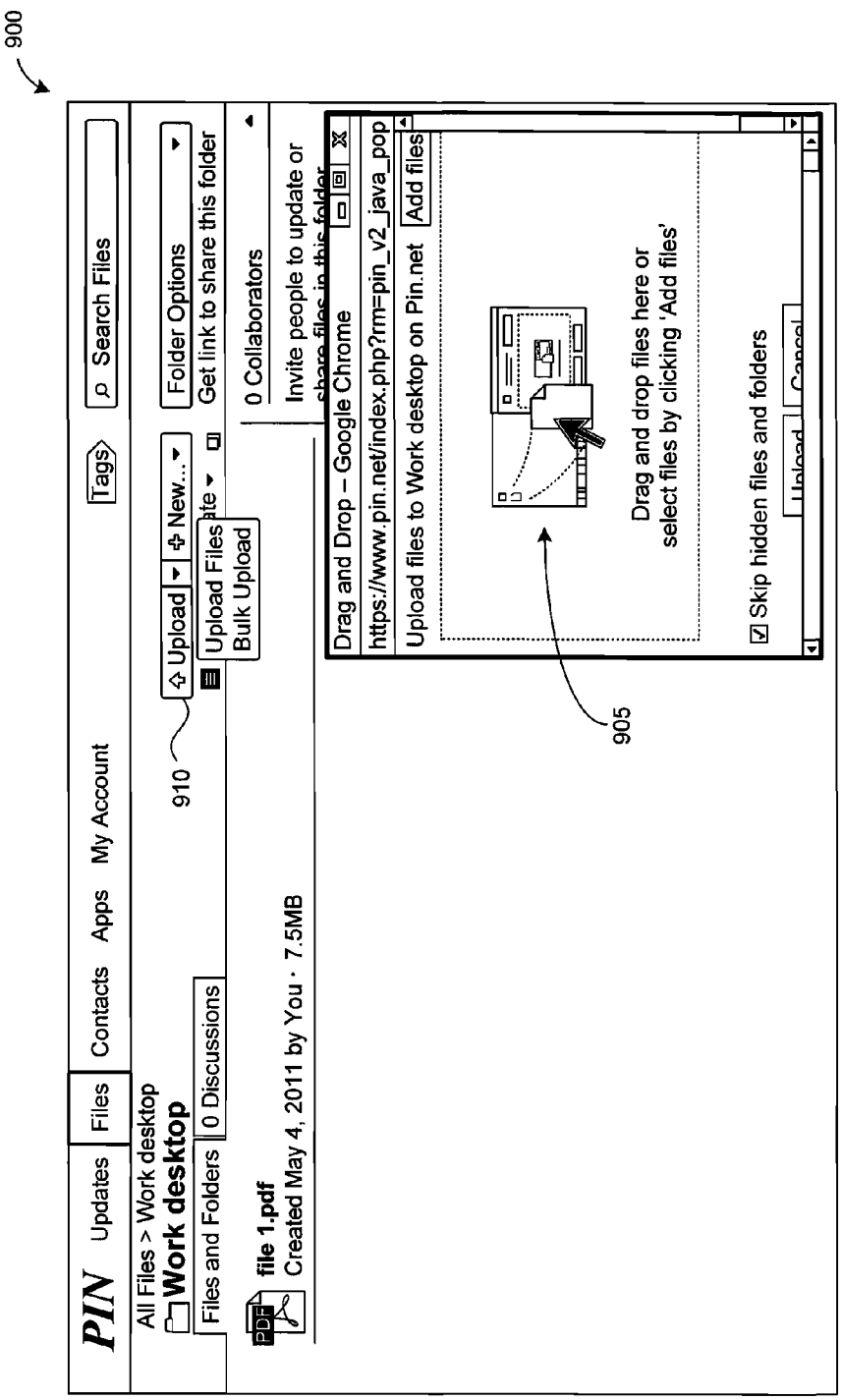
FIG. 9 depicts a screenshot showing an example of a user interface illustrating how drag-and-drop is used to generate a request to upload content to a web-based collaboration environment.

In some instances, the user can generate an upload request by activating the upload feature (e.g., as shown in the example of FIG. 9) in a tab on the user interface and initiate uploading by selecting (e.g., clicking on or otherwise activating) the button/tab. Once selected, another user interface or a pop-up window may appear allowing the user to navigate through files or folders to select the items to be uploaded.

Once upload requests have been detected and processed, the upload engine 415 can upload the requested item or multiple requested items. The upload engine 415 can, in one embodiment, upload a single item or multiple items (e.g., sequentially or simultaneously) to the host server 400. A multiple item upload may be initiated via a single-step or multi-step user request. A multi-file upload request can be handled, processed, and executed, for example, through the multi-file upload manager 416.

In one embodiment, the multi-file upload manager 416 receives an identification of each of the multiple files to be uploaded (e.g., from the upload request processor 405) and sequentially prepares each individual file for uploading and uploads each file independently. For example, the upload manager 416 can compress one of the multiple files individually, upload it to the host server 400 and decompress the file when uploaded and proceed to perform the same steps with the next file. Preprocessing a file can include, for example, analyzing the file size and type to determine if it is acceptable/valid and/or to identify how best to compress the file. Postprocessing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host 400. The upload may automatically progress from one file when completed to the next one in sequence when the user initiates a multi-file upload request.

In one embodiment, the upload engine 415 uploads multiple items in a folder hierarchy based on a single request to upload a folder which has a hierarchy of folders inside, for example, via the folder upload manager 418. In one embodiment, the folder upload manager compresses the multiple items in the folder hierarchy in a single process into a single item and uploads the single item in a single upload process (rather than one by one) to the host server 400. After the merged file of multiple items has been uploaded, the folder upload manager 418 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allows the following overhead to be partially or wholly eliminated: repeatedly creating TCP connections for each upload, repeatedly checking the same permissions and storage quotas when processing the files on the server.

One embodiment of the host server 400 includes the user experience/user interface module 435, which preserves or enhances user experience before, during, or after an upload request. For example, the user experience/user interface module 435 (UE/UI module) can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 426 in the user experience/user interface module 435. In other words, while a file or item upload is in progress, the user can navigate to other pages to perform other actions or initiate additional actions on the current page without interrupting (stopping or pausing) the in-progress upload, as illustrated in the example screenshots of FIG. 11-FIG. 15.

Similarly, when a multi-file or multi-item upload request is in progress, the user can also navigate away from the user interface which the upload request was submitted prior to completion of the uploading of each of the multiple items to the host server 400. Navigation between pages during an upload of multiple files can also be managed by the navigation manager 436. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 400 available for access through the user interface, even when some of the multiple items have not yet been uploaded to the host server, via the upload content access module 440, for example. Thus, during an active upload, individual files which have completed uploading can be accessed or interacted with by the user in the collaborative environment without having to wait for the full upload to complete, as illustrated in the example screenshots of FIG. 13-19.

In some instances, the item which has been uploaded to the host server is manipulable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

In one embodiment, a progress bar indicating upload progress of the upload request is depicted in the user interface, as shown in the examples of FIG. 10-18. The progress bar indicates the progress of the upload of the full request, typically. For example, if the request is a multi-file upload request, the progress bar indicates the progress of uploading all of the files. In addition, the progress bar can further indicate the total size of upload, time elapse, completed upload file size, time remaining, average sped of upload, and/or total files that have completed upload. Upload progress can be determined since at any moment the uploader knows the total bytes that have been transferred, the time elapsed, and total size of the upload. In one embodiment, the time elapsed can be determined to count only the time that files are being transferred, and not the time files are being processed. In one embodiment, the progress bar is depicted even when the user navigates away from the user interface to another user interface during the upload process.

One embodiment of the host server 400 includes a notification engine 455. The notification engine 455, can for example, update a feed stream to include an updated feed indicate that an item or multiple items have been uploaded, for example, via the feed stream updator 456. The users that are notified can be selected, for example, by the recipient selector 458, and can include collaborators or the user, or other users meeting a criterion. In some instances, the feed stream is updated in real time or near real time relative to when the upload of the item completed. For real-time updating, the notification engine 455 can utilize another server, or another engine in the same server which provides push functionality, as illustrated in the example of FIG. 4.

The notification engine 455 can generally can users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 415 can utilize a push-enabled service to ensure real time notification. In one embodiment, the notification is sent by a component or another server which implements push technology (e.g., the notification server 500 shown in the example of FIG. 5). The push-enabled service can be implemented via long poll or HTTP streaming, for example, by the notification sever 500 or another component, device which may be internal to or external to the host server 400. In addition, the host server 400 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.)

The host server 400 can send a notification server an identification of the recipient to be notified and indicator of the activity to notify the recipient of. Use of an external push server, such as the notification server 550 is described with further reference to the example of FIG. 5. The notification server 550 can be managed by the notification server manager 416 in the notification engine 415 which can communicate events to notify users in real-time via their browser interfaces. In one embodiment, the host server 400 sends a notification server an identification of the recipient to be notified and indicator of the activity to notify the recipient of.

The notification engine 455 can determine the channel through which to notify selected users or recipients of the upload (e.g., an upload request, completion of upload of a single item, multiple items, and/or a full upload request). The channels that are used can include, indicators via a user interface to the online collaboration environment, SMS, audio message, text-based messages, email, desktop application, RSS, etc.

Figure 5:
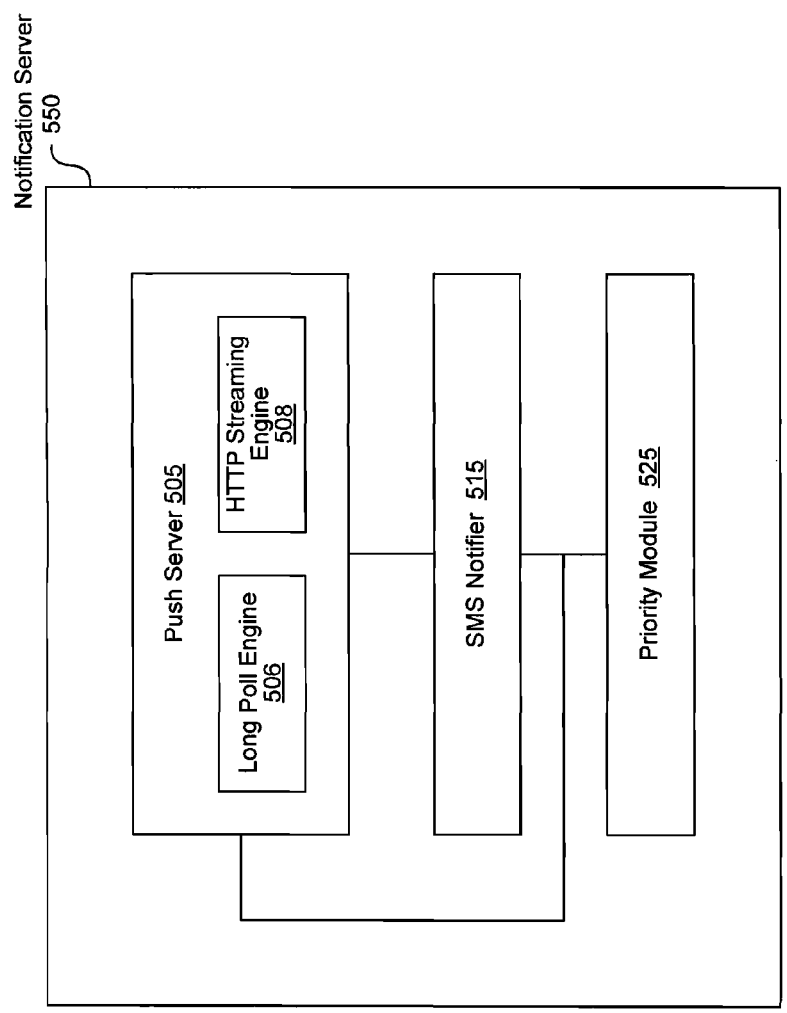
FIG. 5 depicts a block diagram illustrating an example of components in a notification server for providing real time or near real time notifications of activities that occur in a web-based or online collaboration environment including initiation or completion of uploads.

FIG. 5 depicts a block diagram illustrating an example of components in a notification server 550 for providing notifications (including real time and non real time notifications) of activities that occur in a web-based or online collaboration environment including initiation or completion of uploads.

The notification server 550 generally includes, for example, a push server 505, an SMS notifier 515, and/or a priority module 525. In one embodiment, the push server 505 includes a long poll engine 506 and/or an HTTP streaming engine 508. Additional or less components/modules/engines can be included in the notification server 550 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The notification server 550 can support the services of a collaboration platform or environment to provide real time or near real time notifications of activities such as actions relating to uploads. In one embodiment, the notification server 550 is integrated within a host server of a collaboration platform (e.g., the host server 100 shown in the example of FIG. 1 or the host server 400 shown in the example of FIG. 4, for example). The notification server 550 may also be externally coupled to the host server (e.g., the host server 100 or 400. In some instances, a portion of the functions implemented and performed by the notification server 550 can be implemented in part or in whole in the host server 100 or 400. For example, some of the components shown to be in the notification server 500 and associated functionalities can in part or in whole reside in the host server 100 or 400.

In one embodiment, the notification server 550 sends a notification of an activity (e.g., activity relating to an upload, an upload request, completion of upload of a single item, multiple items, or an upload request) that occurs within a collaboration platform to a recipient. The notification is sent by the server 550 such that the recipient is notified in real time or near real time to when the activity occurred or when the activity was performed. Real time notification can be performed via push technology, for example by the push server 505 through long polls (e.g., via the long poll engine 506) and/or through the HTTP streaming (e.g., via the HTTP streaming engine 506). The notification server 550 can communicate with the host server to determine a recipient to whom to notify. The notification server 550 can also determine the activity to notify the recipient of, for example through communication with the host server.

In one embodiment, the notification is presented in a feed stream among other notifications through a user interface on the user device according to relevancy to the user determined based on current or recent activity of the user in the web-based collaboration environment. In one embodiment, the notification server 550 can send notifications to users via SMS (e.g., through the SMS notifier 515). In this instance, the notification server 500 can be coupled to an SMS center which forwards the SMS text message to a mobile device over a cellular network. The notification can be sent via SMS in real time or near real time, or with a delay.

Figure 6:
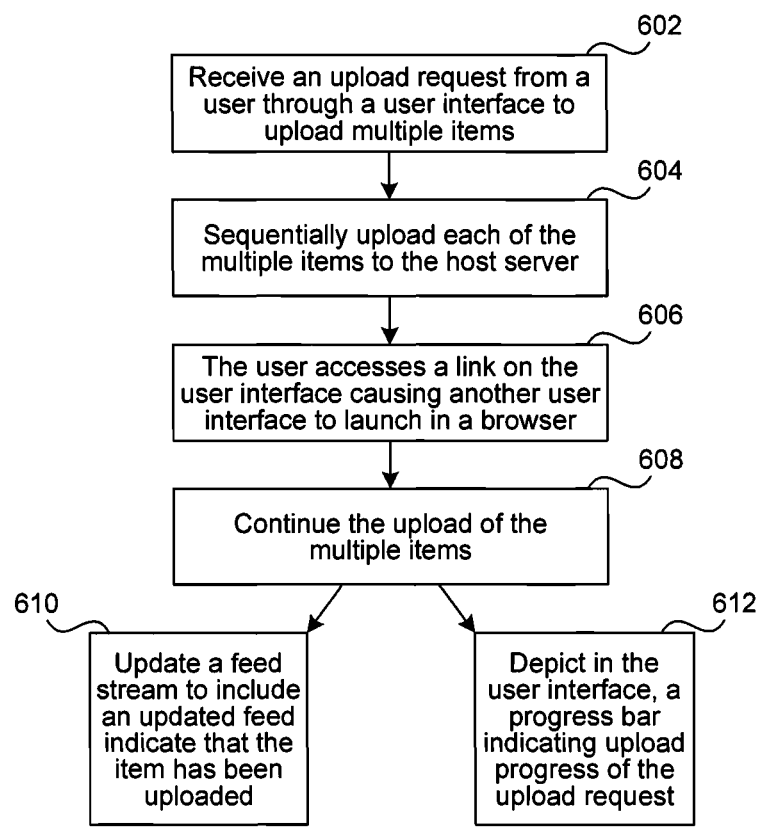
FIG. 6 depicts a flow chart illustrating an example process for enhanced uploading of content to a host server in an online collaboration environment while preserving or enhancing user experience.

FIG. 6 depicts a flow chart illustrating an example process for enhanced uploading of content to a host server in an online collaboration environment while preserving or enhancing user experience.

In process 602, an upload request is received from a user through a user interface to upload multiple items. The upload request is generated when a folder having the multiple items on a client device that is to be uploaded is identified through the user interface, through any known or convenient mechanism. For example, the user can select one or multiple files, to be uploaded one by one, or to be uploaded in a single request. In addition, the upload request can be generated via a drag-and-drop action of the multiple work items to be uploaded into a portion of the user interface. In process 604, each of the multiple items is sequentially uploaded to the host server. The host server can be a web server hosting an online collaboration environment.

In one embodiment, the upload of the multiple items is not interrupted if the user accesses a link on the user interface. For example, in process 606, the user accesses a link on the user interface causing another user interface to launch in a browser and in process 608, the upload of the multiple items can continue as it was progressing.

In addition, an item of the multiple items that has been uploaded to the host server can be made available for access through the user interface, even when some of the multiple items have not yet been uploaded to the host server. In some instances, the item which has been uploaded to the host server is manipulable by the user through the user interface, without a need for browser refresh. For example, the user may be able to view, edit, preview, or comment on the item that has been uploaded, even prior to completion of uploading all of the multiple items.

In process 610, a feed stream is updated to include an updated feed indicate that the item has been uploaded. The feed stream can be updated in real time or near real time relative to when the upload of the item completed In process 612, a progress bar indicating upload progress of the upload request is depicted in the user interface. In some instances, the progress bar is depicted even when the user navigates away from the user interface to another user interface during the upload process.

Figure 7:
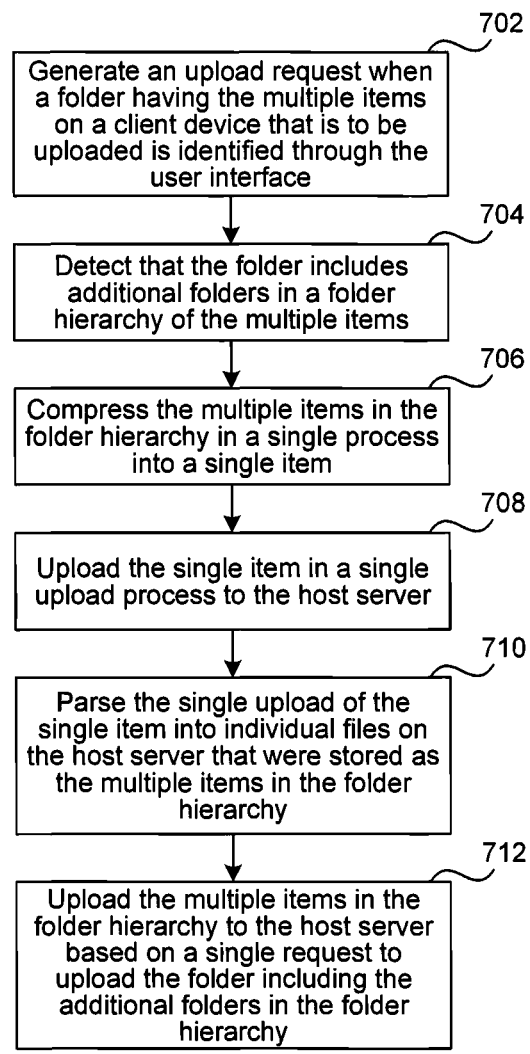
FIG. 7 depicts a flow chart illustrating an example process for uploading multiple items in a hierarchy of folders based on a single request to upload a folder which includes multiple folders in the hierarchy.

FIG. 7 depicts a flow chart illustrating an example process for uploading multiple items in a hierarchy of folders based on a single request to upload a folder which includes multiple folders in the hierarchy.

In process 702, an upload request is generated when a folder having the multiple items on a client device that is to be uploaded is identified through the user interface. In one embodiment, the upload request is generated via a drag-and-drop action of the folder containing the multiple work items to be uploaded to the host server into a portion of the user interface.

In process 704, it is detected that the folder includes additional folders in a folder hierarchy of the multiple items. In process 706, the multiple items in the folder hierarchy are compressed in a single process into a single item. In process 708, the single item is uploaded in a single upload process to the host server. In process 710, the single upload of the single item is parsed into individual files on the host server that were stored as the multiple items in the folder hierarchy. In process 712, the multiple items in the folder hierarchy are uploaded to the host server based on a single request to upload the folder including the additional folders in the folder hierarchy.

In one embodiment, the user is able to navigate away from the user interface through which the upload request was submitted prior to completion of the uploading of each of the multiple items to the host server.

Figure 8:
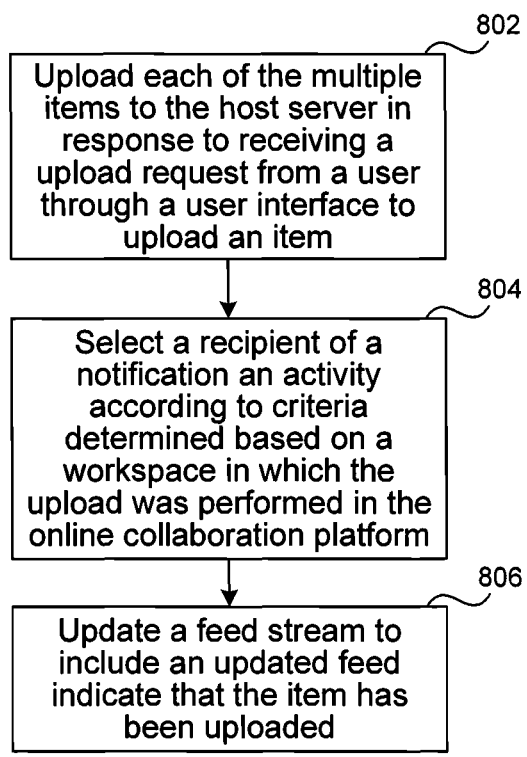
FIG. 8 depicts a flow chart illustrating an example process for providing a notification of an upload to an online collaboration platform.

FIG. 8 depicts a flow chart illustrating an example process for providing a notification of an upload to an online collaboration platform.

In process 802, each of the multiple items is uploaded to the host server in response to receiving a upload request from a user through a user interface to upload an item. In process 804, a recipient of a notification an activity is selected according to criteria determined based on a workspace in which the upload was performed in the online collaboration platform. In process 806, a feed stream is updated to include an updated feed indicate that the item has been uploaded. The feed stream can be updated in real time or near real time to when the activity occurred FIG. 9 depicts a screenshot showing an example of a user interface 900 illustrating how drag-and-drop is used to generate a request to upload content to a web-based collaboration environment.

The user can drag and drop one or more files into region 905 of the user interface to generate a request to upload the dragged files. Alternatively, the user can select the 'add files' feature in the region 905 of the user interface to select the file one by one user cursor selection action. In addition, upload button 910 can also be used to initiate a file upload request. The request can be generated to upload a file one by one or to initiate a bulk upload request.

Figure 10:
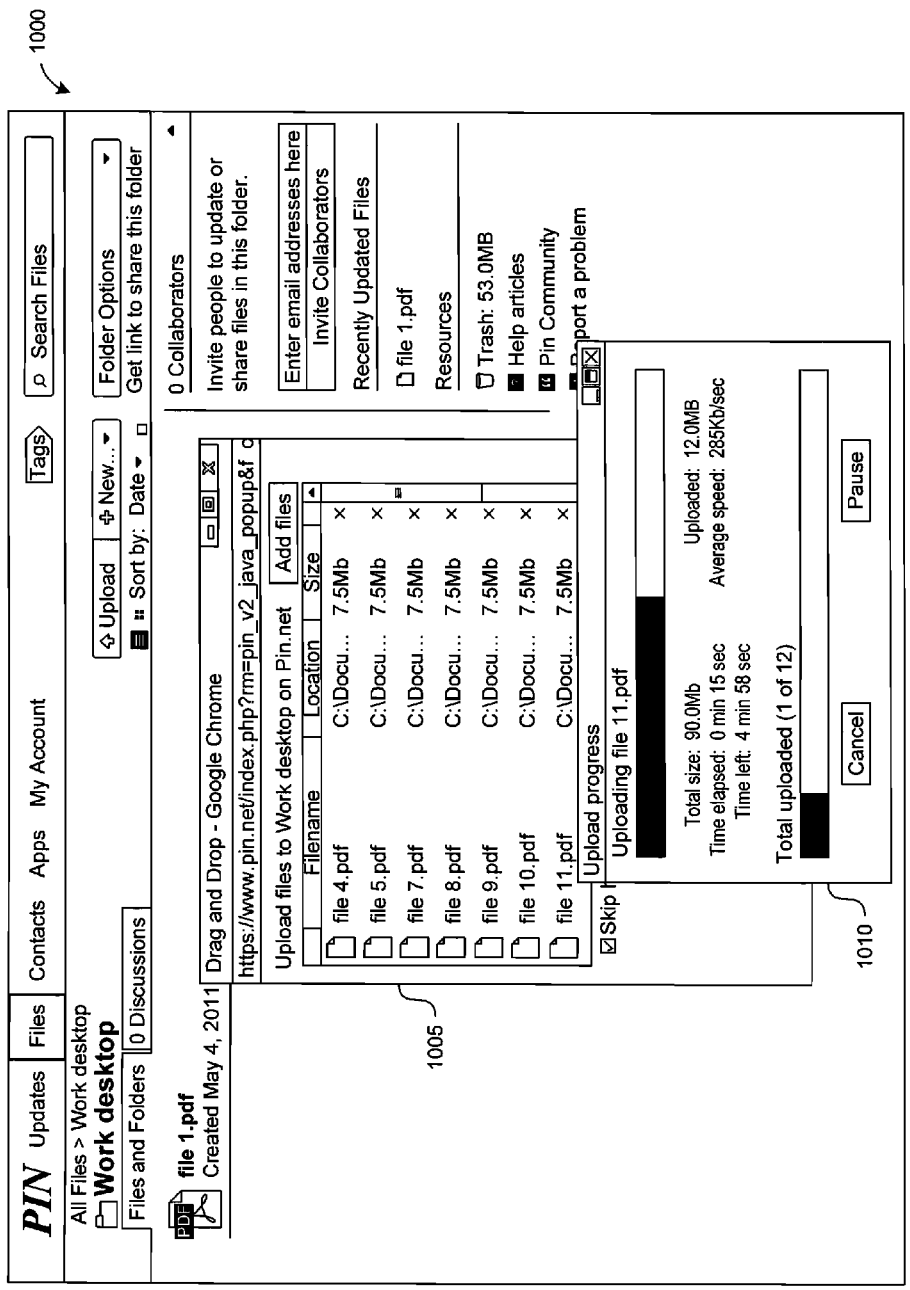
FIG. 10 depicts a screenshot showing an example of a user interface illustrating multiple files queued up to be uploaded to a web-based collaboration environment and the upload progress of the upload request.

FIG. 10 depicts a screenshot 1000 showing an example of a user interface illustrating multiple files queued up 1005 to be uploaded to a web-based collaboration environment and the upload progress of the upload request 1010. The upload progress bar can show the progress of the entire upload request (e.g., for all files shown in the queue 1005). The upload progress bar can additionally identify the current file being uploaded, total size of uploads, time elapsed, time remaining, etc.

Figure 11:
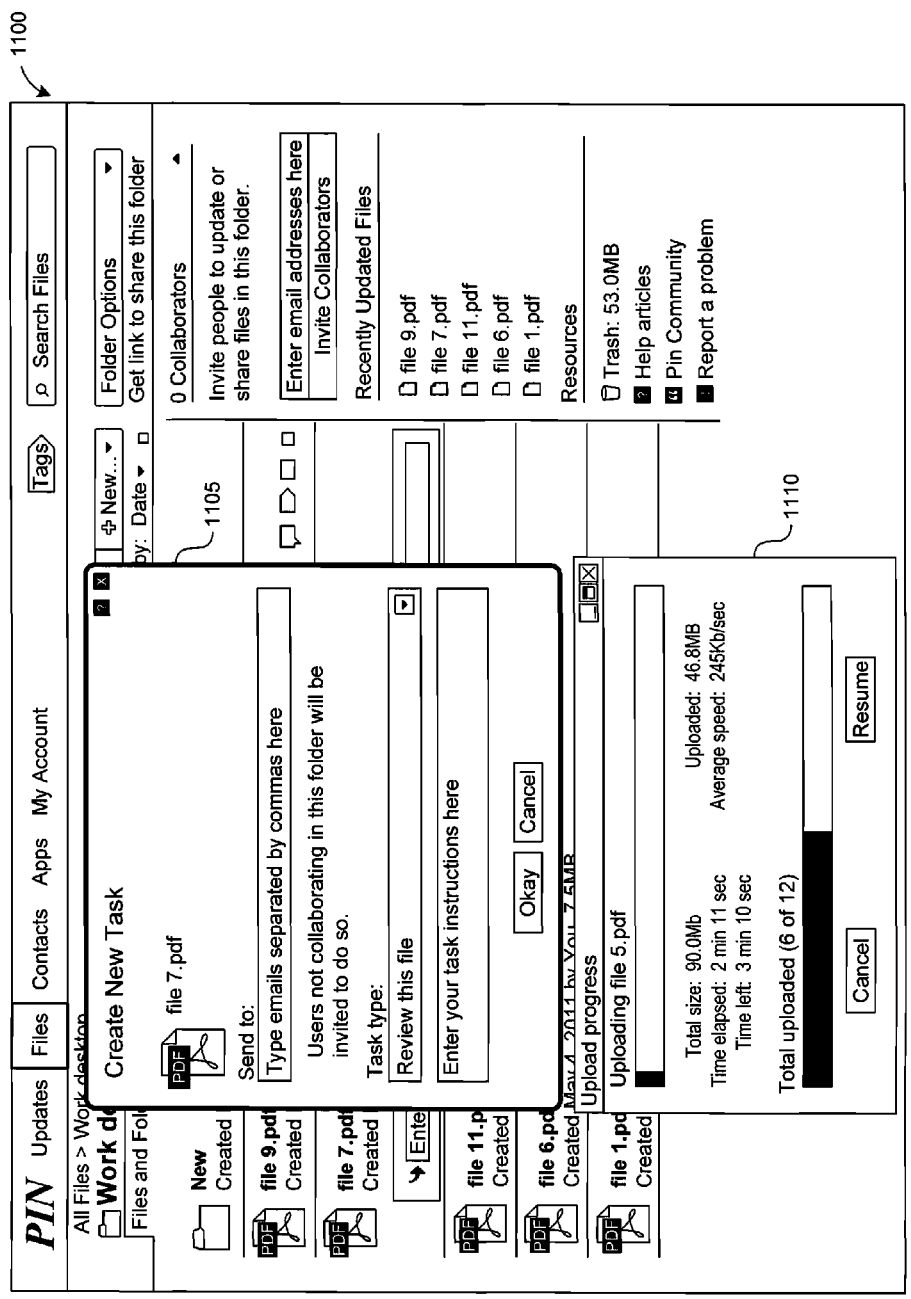
FIG. 11 depicts a screenshot showing an example of a user interface illustrating how an active upload does not prevent the user from initiating or participating in other actions in the collaboration environment.
Figure 12:
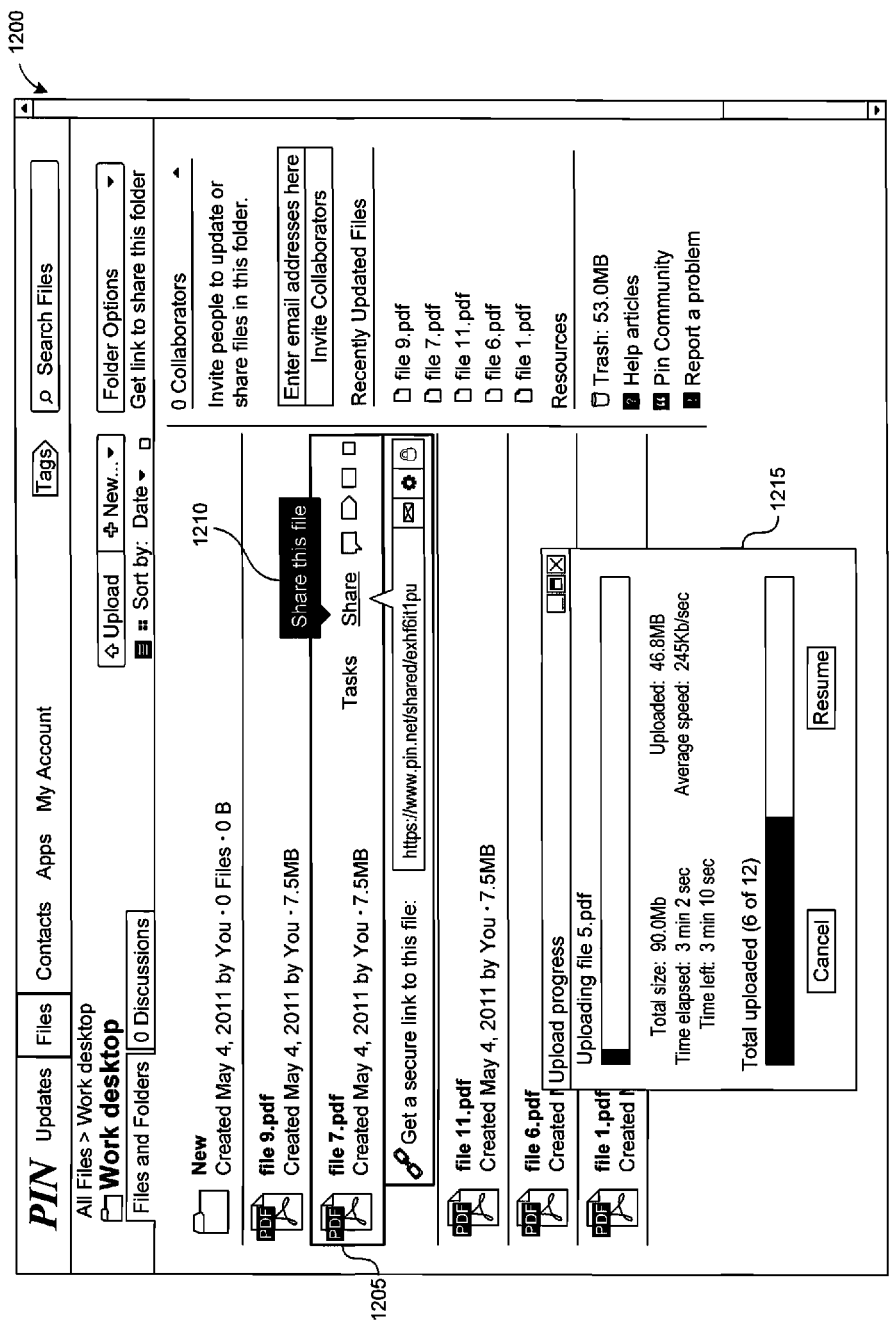
FIG. 12-15 depicts a screenshot showing an example of a user interface illustrating how an item that has been uploaded to the host server is available for access (e.g., for sharing, commenting, previewing, downloading, etc.) through the user interface, even when some of the multiple items have not yet been uploaded to the host server.
Figure 13:
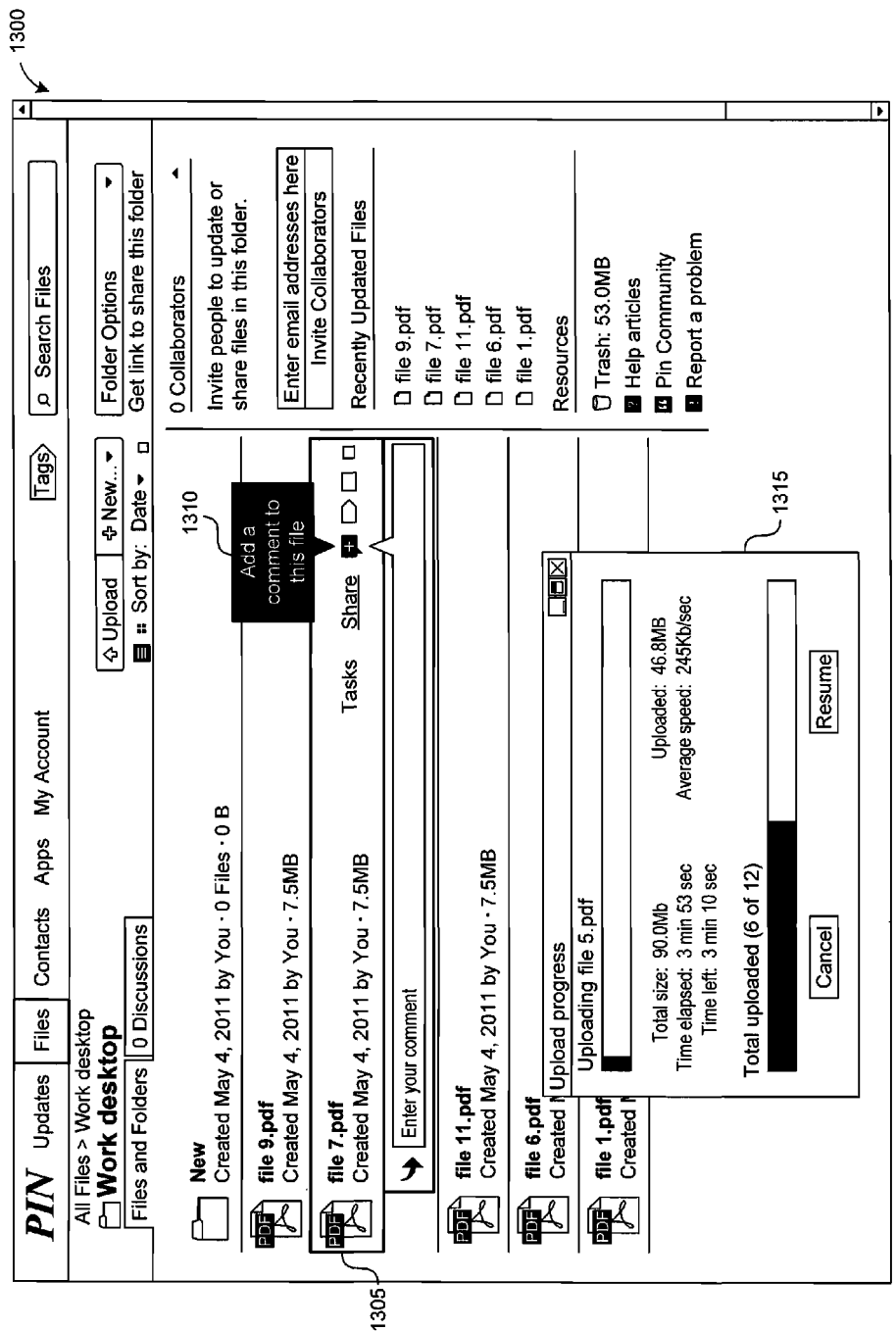
Figure 14:
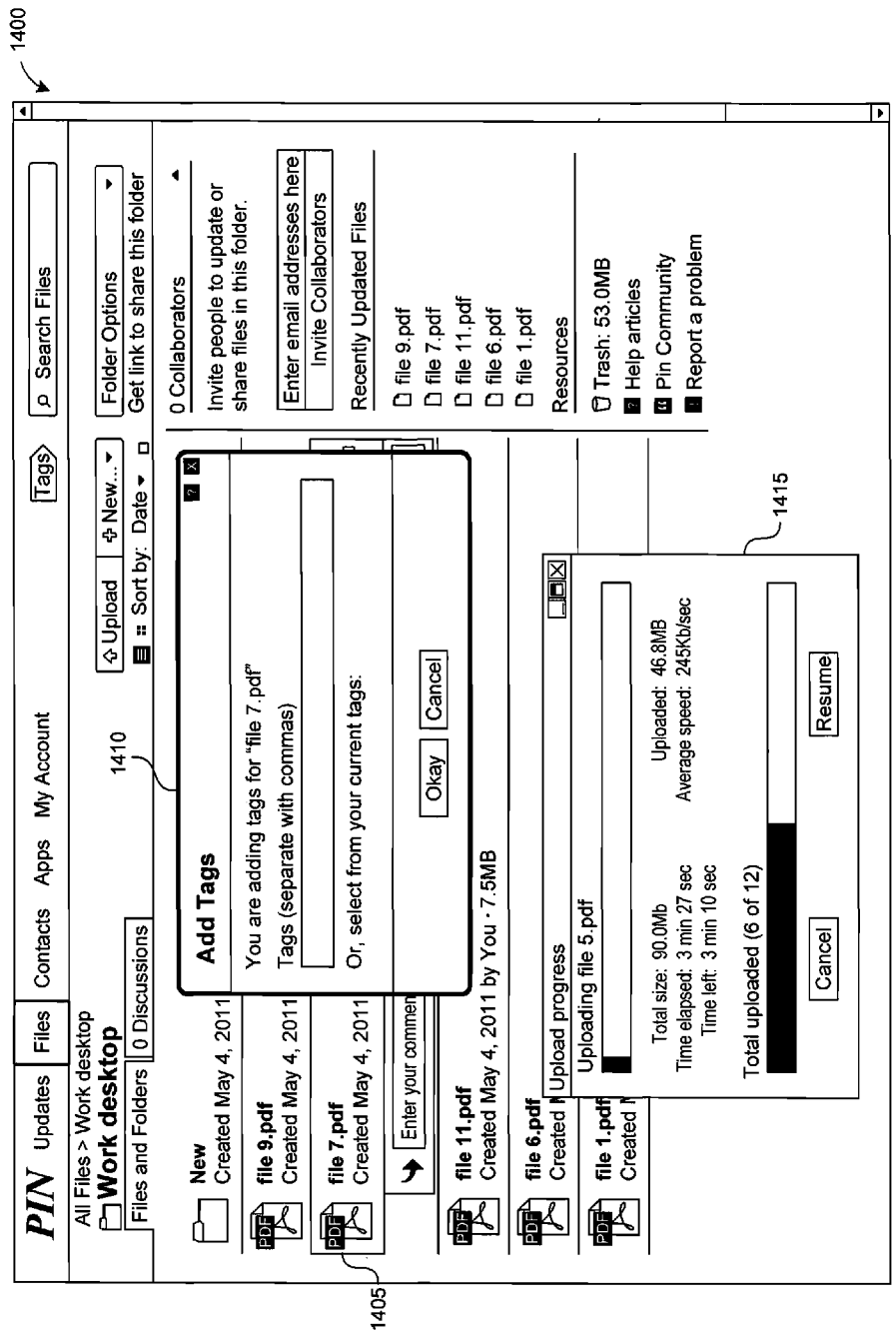
Figure 15:
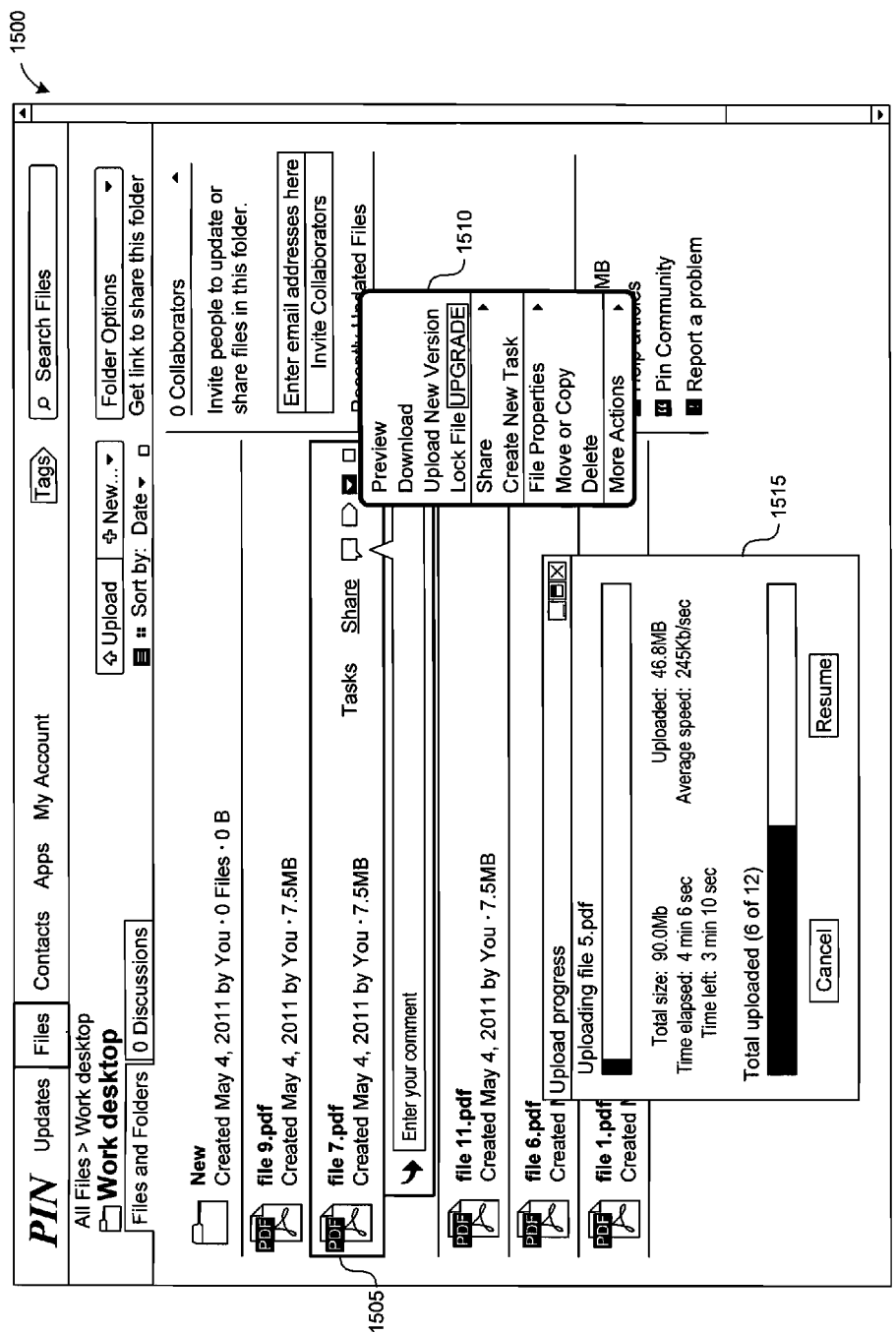

FIG. 11 depicts a screenshot showing an example of a user interface 1100 illustrating how an active upload 1110 does not prevent the user from initiating or participating in other actions (e.g., creating a new task 1105) in the collaboration environment. FIG. 12-15 depicts additional screenshots showing examples of user interfaces illustrating how an item that has been uploaded to the host server is available for access (e.g., for sharing 1210, commenting 1310, adding tags 1410, previewing or downloading 1510, etc.) through the user interface, even when some of the multiple items have not yet been uploaded to the host server (as illustrated by the upload progress bars).

Figure 16:
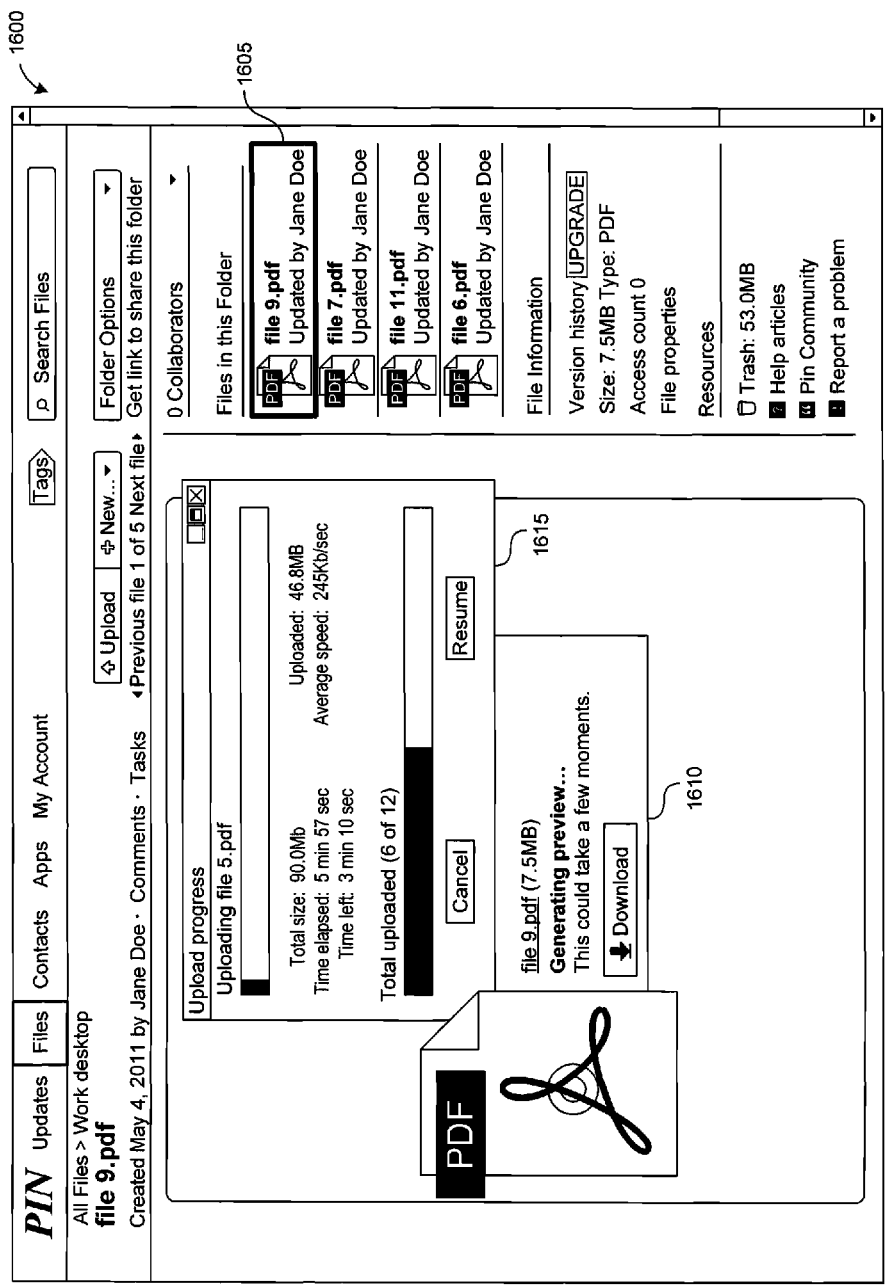
FIG. 16 depicts a screenshot showing an example of a user interface illustrating how the user is able to navigate away from the user interface through which the upload request was requested to preview an item that has been uploaded while active uploads are still in progress.
Figure 17:
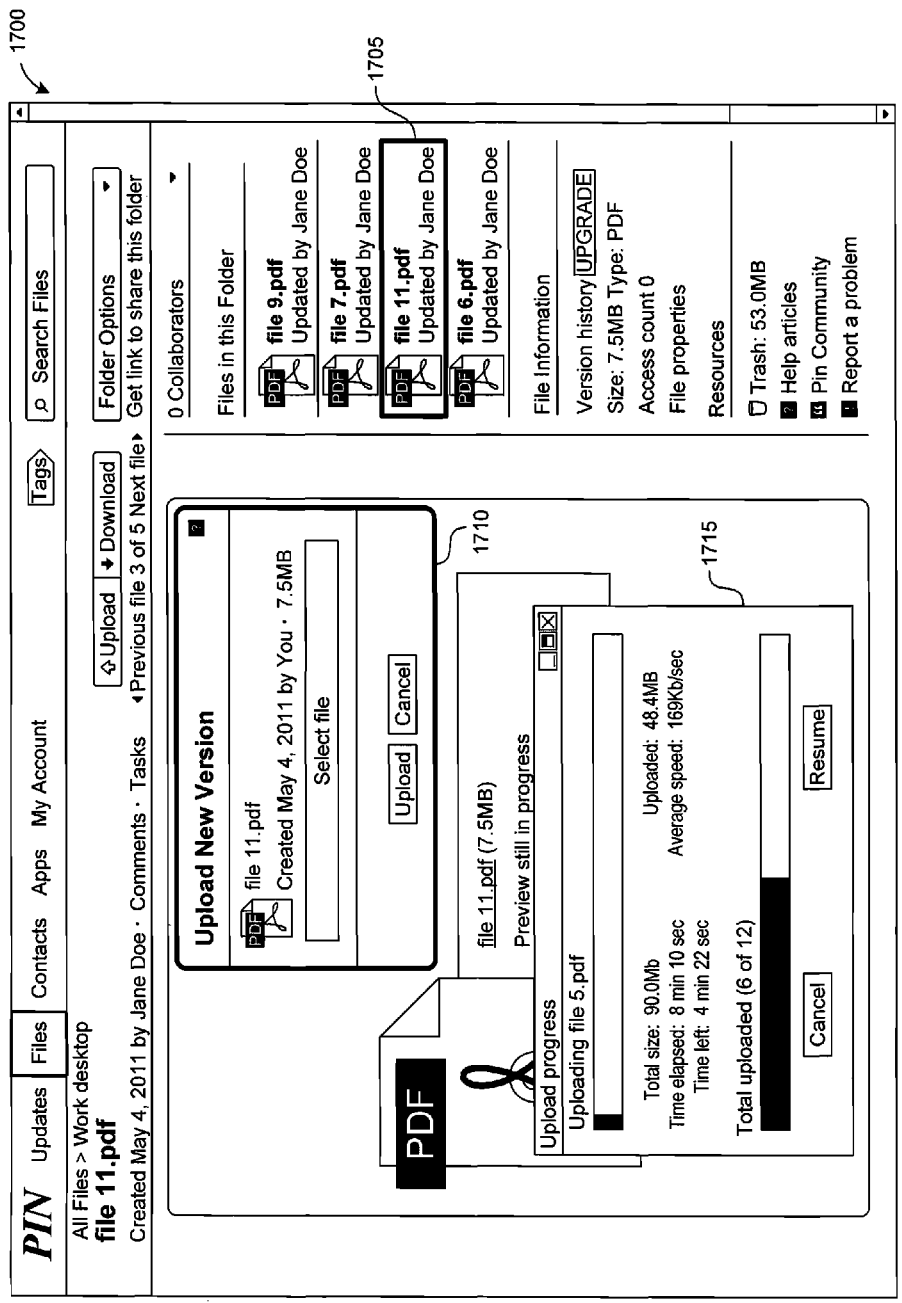
FIG. 17 depicts a screenshot showing an example of a user interface illustrating how a new upload request can be initiated while active uploads are still in progress.

FIG. 16 depicts a screenshot showing an example of a user interface 1600 illustrating how the user is able to navigate away from the user interface through which the upload request was requested to preview or download 1610 an item (e.g., item file 9 1605) that has been uploaded while active uploads are still in progress, as illustrated by the upload progress bar 1615. FIG. 17 depicts a screenshot showing an example of a user interface 1700 illustrating how a new upload request 1710 of an already uploaded item (e.g., file 11.pdf 1705) can be initiated while active uploads are still in progress, as indicated by the upload progress bar 1715.

Figure 18:
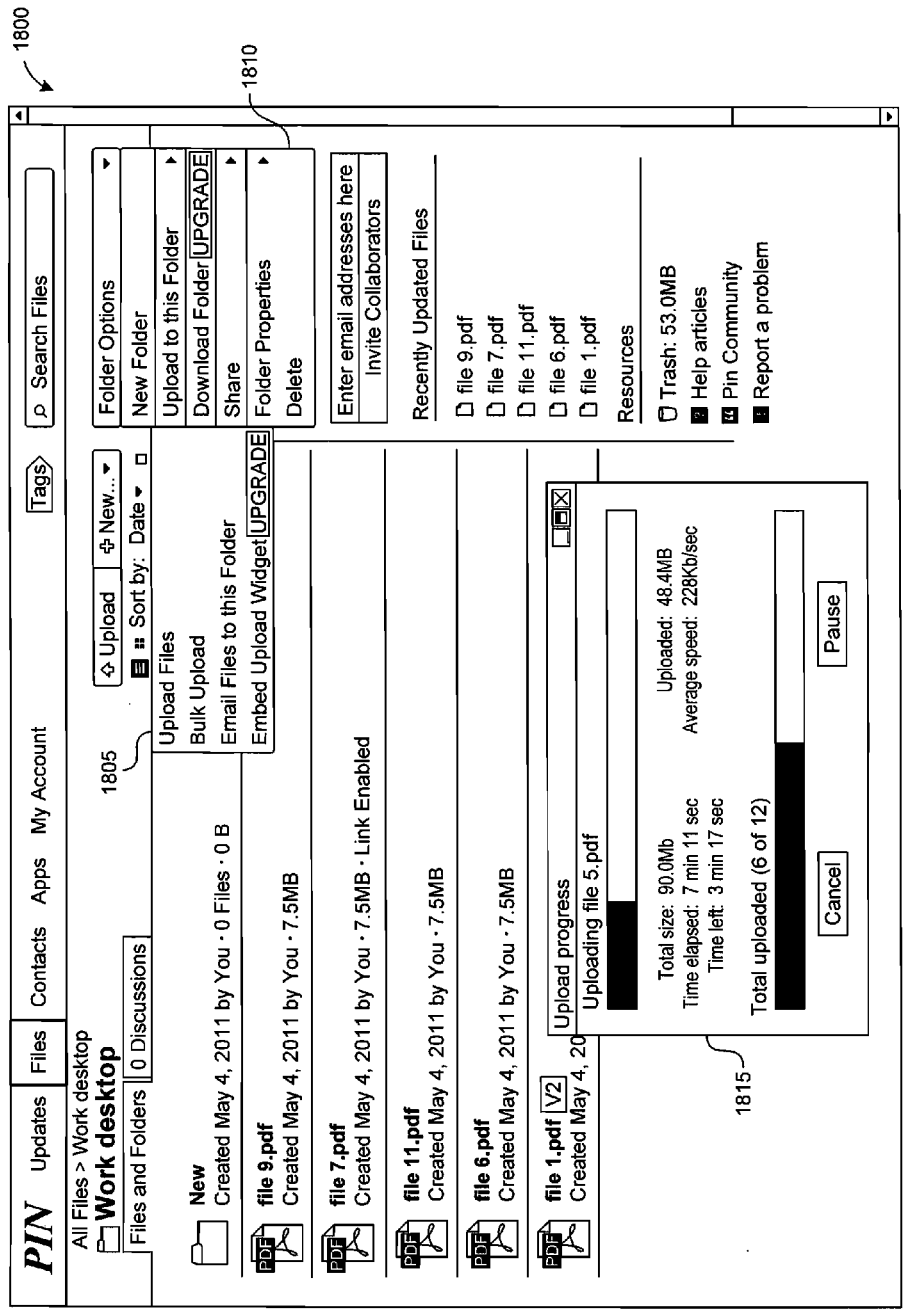
FIG. 18 depicts a screenshot showing an example of a user interface illustrating how various features in the collaboration environment can be used while active uploads are in progress.
Figure 19:
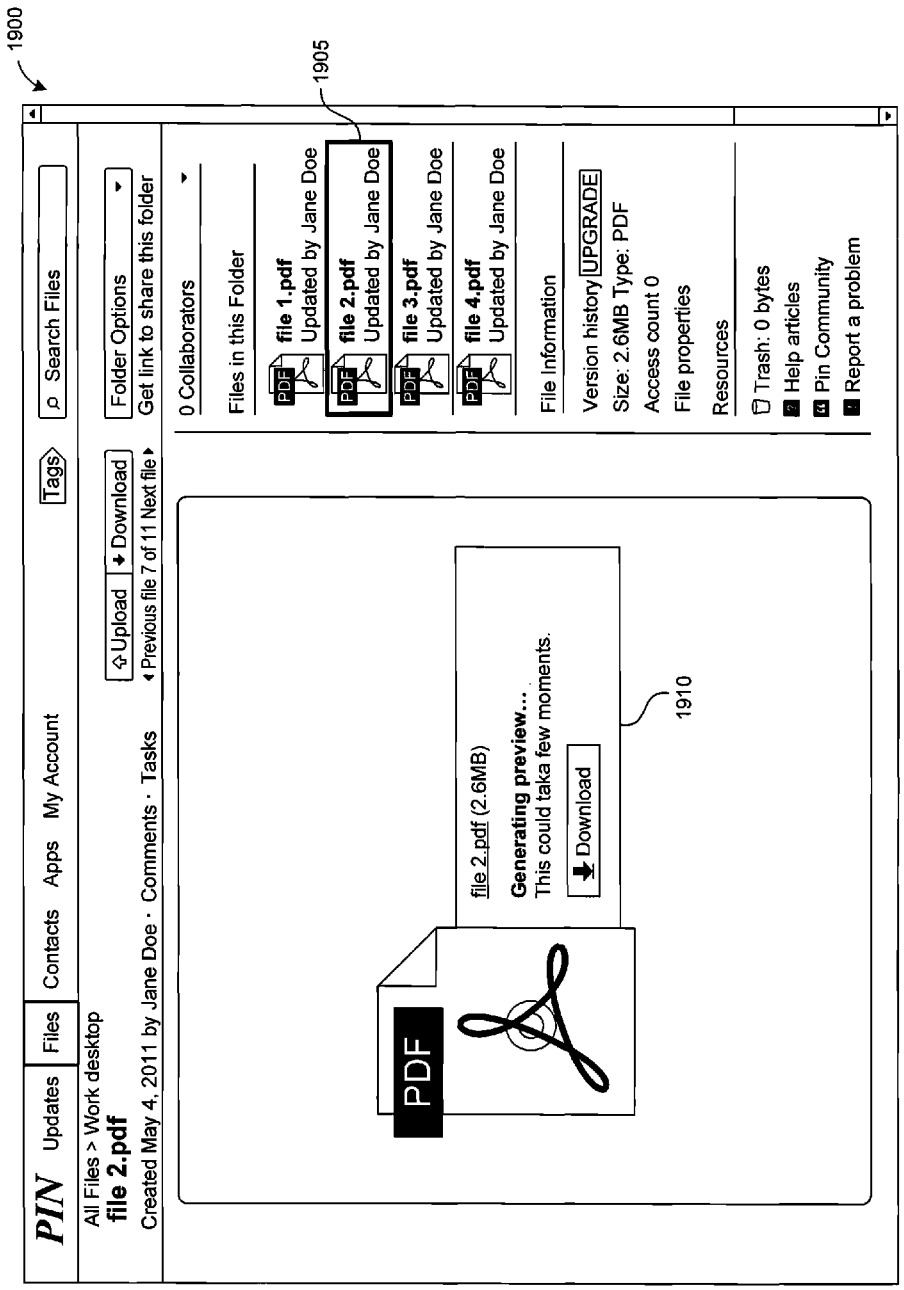
FIG. 19 depicts a screenshot showing an example of a user interface illustrating preview generation of a requested file after uploads have been completed.

FIG. 18 depicts a screenshot showing an example of a user interface 1800 illustrating how various features accessible in tabs 1805 and 1810 in the collaboration environment can be used while active uploads are in progress. FIG. 19 depicts a screenshot showing an example of a user interface 1900 illustrating preview generation 1910 of a requested file 1905 after uploads have been completed.

Figure 20:
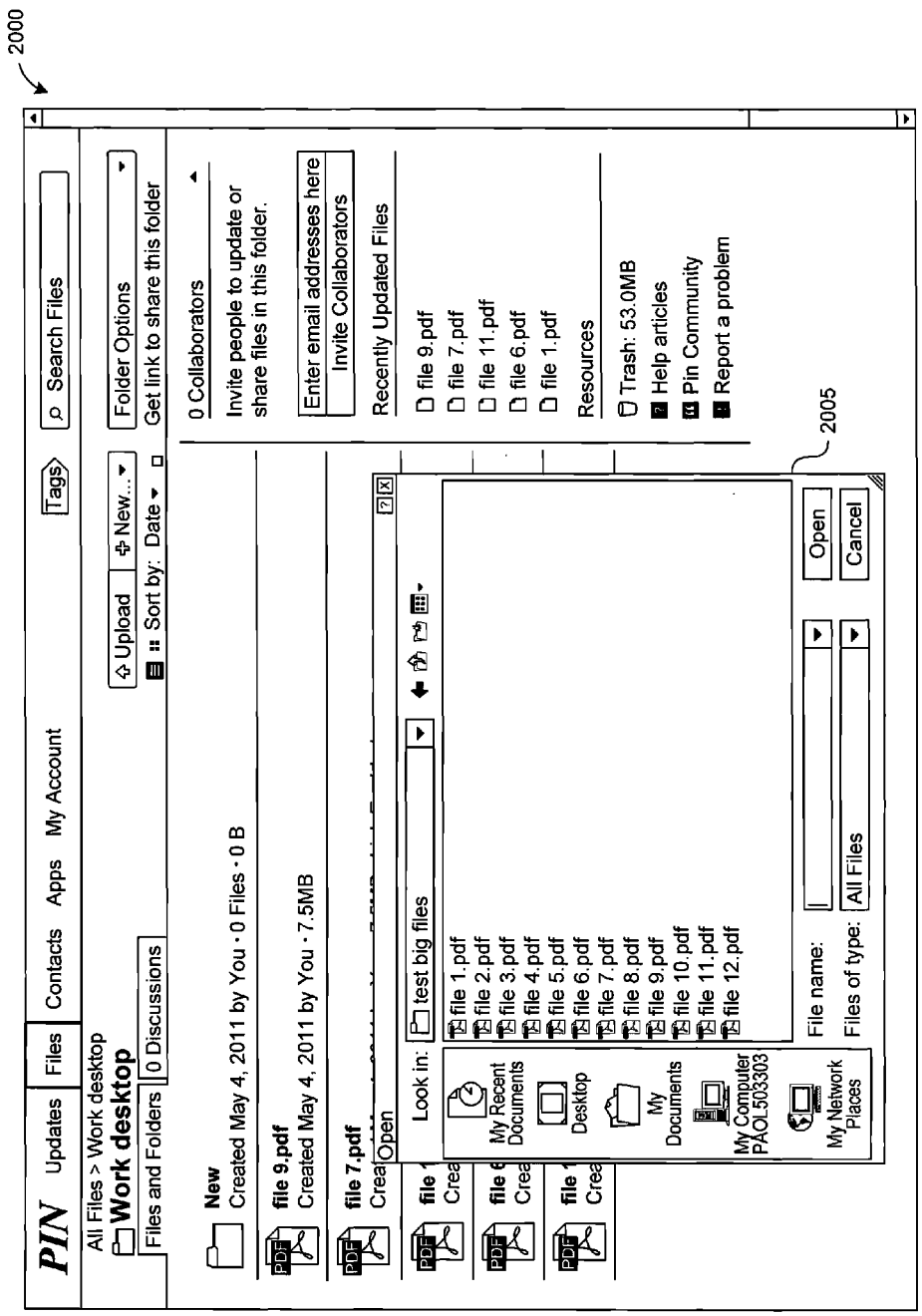
FIG. 20 depicts a screenshot showing an example of a user interface illustrating how a file selection mechanism is used to generate a request to upload content to a web-based collaboration environment.
Figure 21:
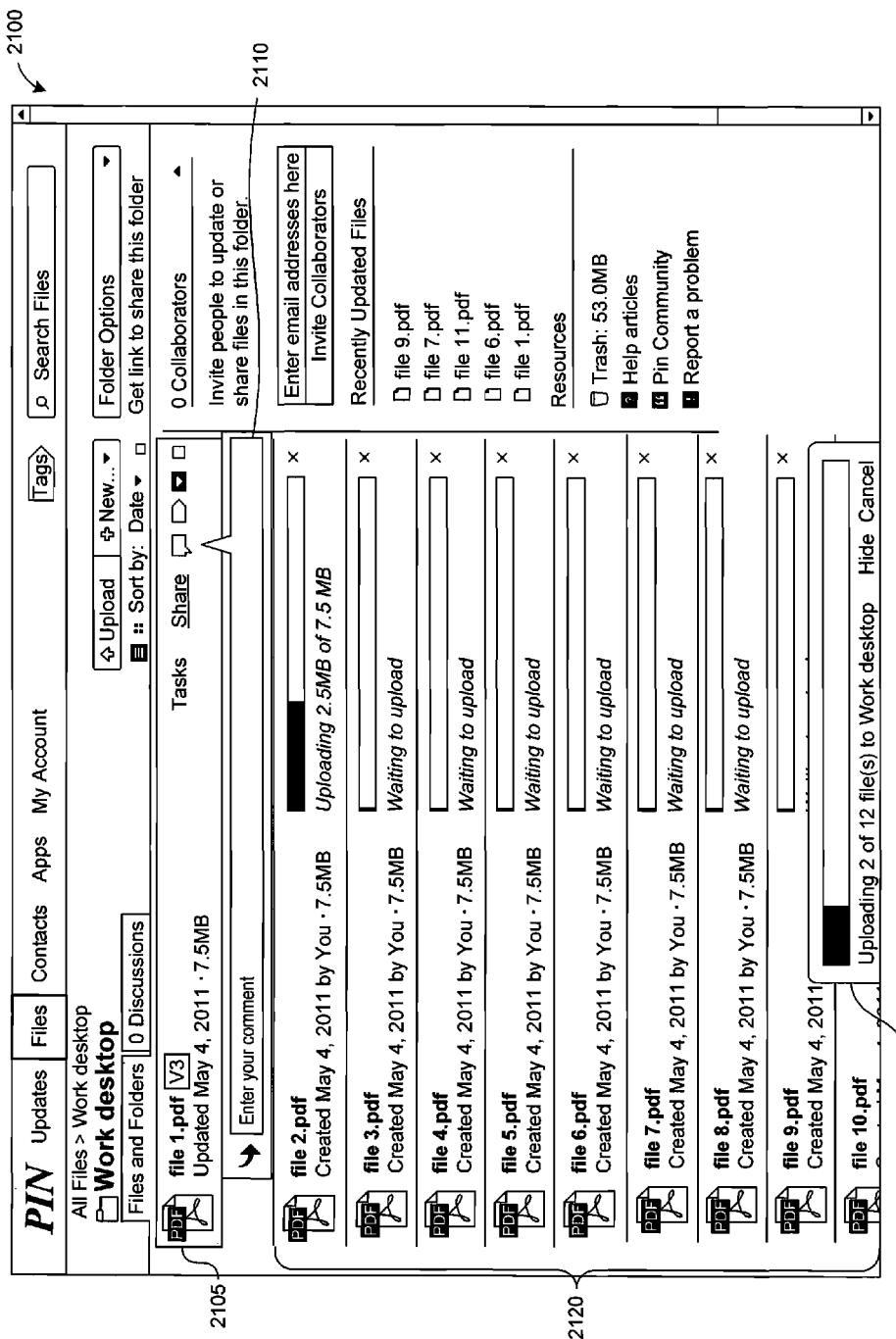
FIG. 21 depicts a screenshot showing another example of a user interface illustrating how an item that has been uploaded to the host server is available for access (e.g., for sharing, commenting, previewing, downloading, etc.) through the user interface when active uploads are in progress and another example of an upload progress bar.

FIG. 20 depicts a screenshot showing an example of a user interface 2000 illustrating how a file selection mechanism 2005 is used to generate a request to upload content to a web-based collaboration environment. FIG. 21 depicts a screenshot showing another example of a user interface 200 illustrating how an item 2105 that has been uploaded to the host server is available for access (e.g., for sharing, commenting, previewing, downloading, via 2110) through the user interface when active uploads are in progress and another example of an upload progress bar 2115.

Figure 22:
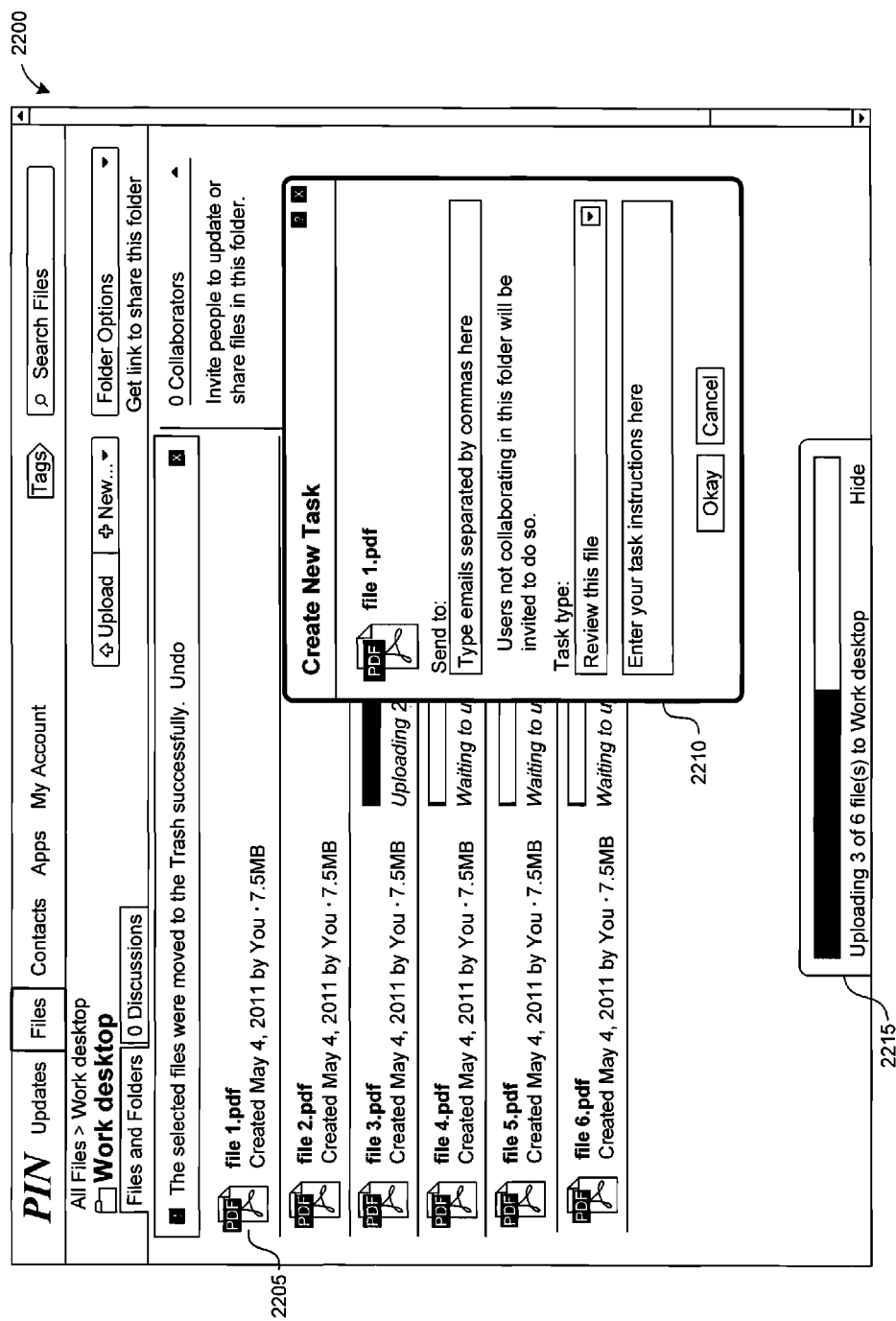
FIG. 22-23 depict screenshots showing additional example of a user interface illustrating how an active upload does not prevent the user from initiating or participating in other actions (e.g., create a new task or tag a file) in the collaboration environment.
Figure 23:
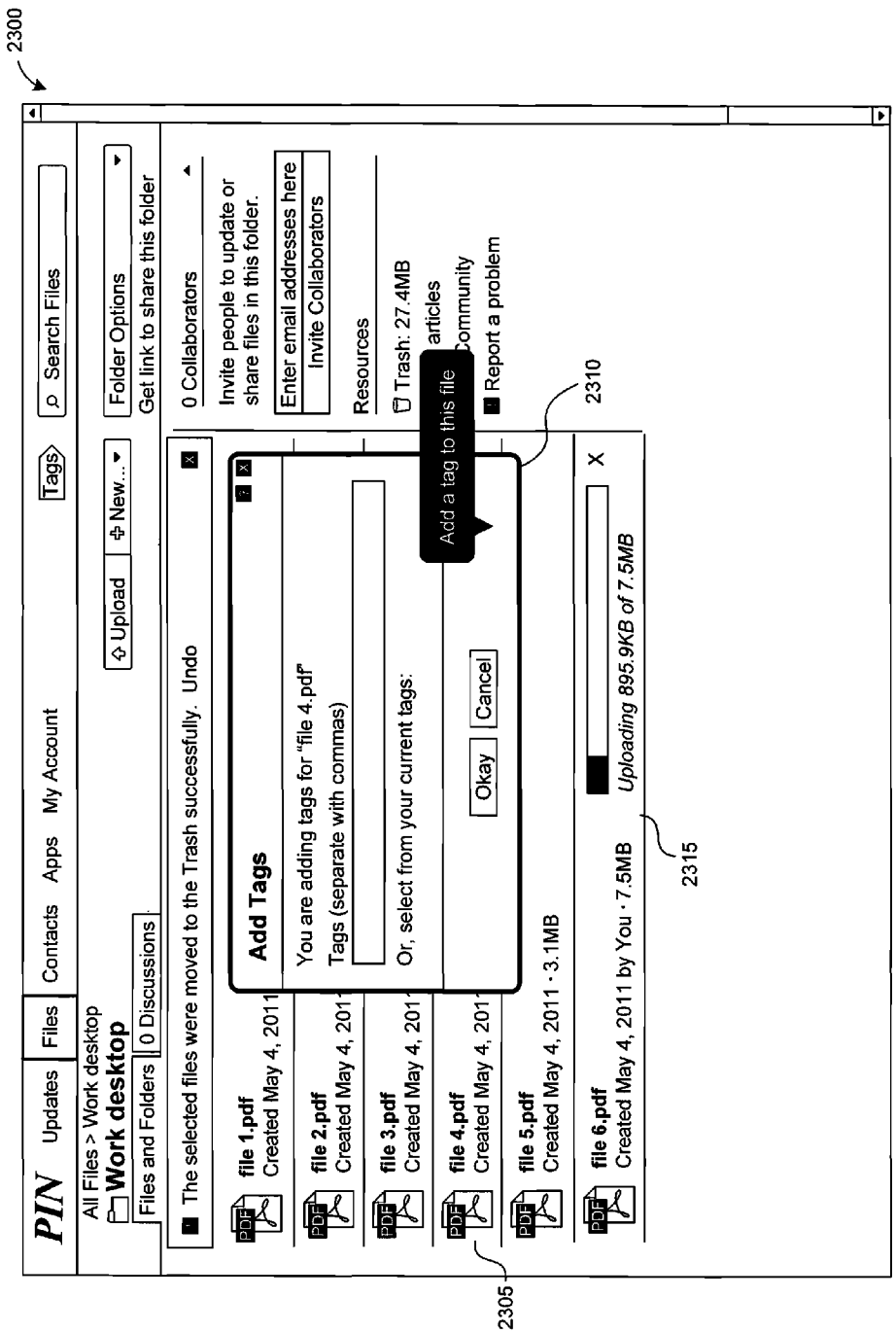

FIG. 22-23 depict screenshots showing additional example of user interfaces illustrating how an active upload does not prevent the user from initiating or participating in other actions (e.g., create a new task in pop-up 2210 or tag a file via pop-up 2310) in the collaboration environment.

Figure 24:
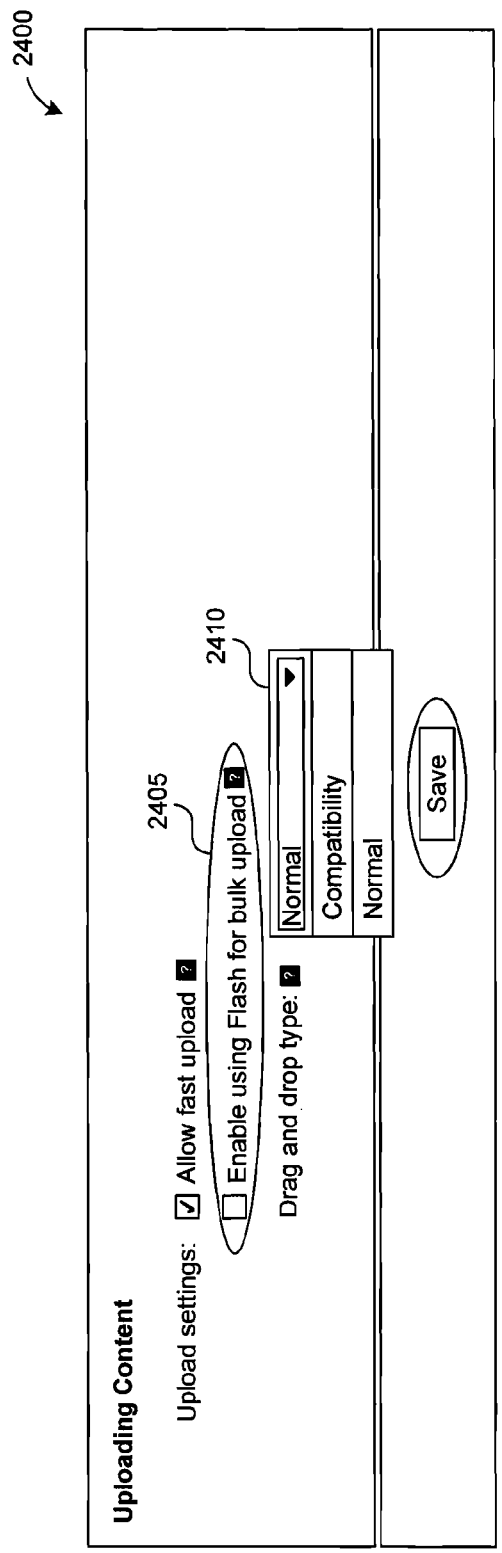
FIG. 24 depicts a screenshot showing additional example of a user interface for use in specifying upload preferences.

FIG. 24 depicts a screenshot showing additional example of a user interface for use in specifying upload preferences. For example, flash can be optionally used for bulk uploading and can be selected in 2405. Drag-and-drop type can be selected to be in normal mode or compatibility mode 2410. Drag-and-drop modes are (1) Normal, which is an applet that is platform specific (e.g., specific to the collaboration environment), and (2) compatibility, a 3rd party applet that is provided as an alternative in case the user is experiencing unknown networking issues.

Figure 25:
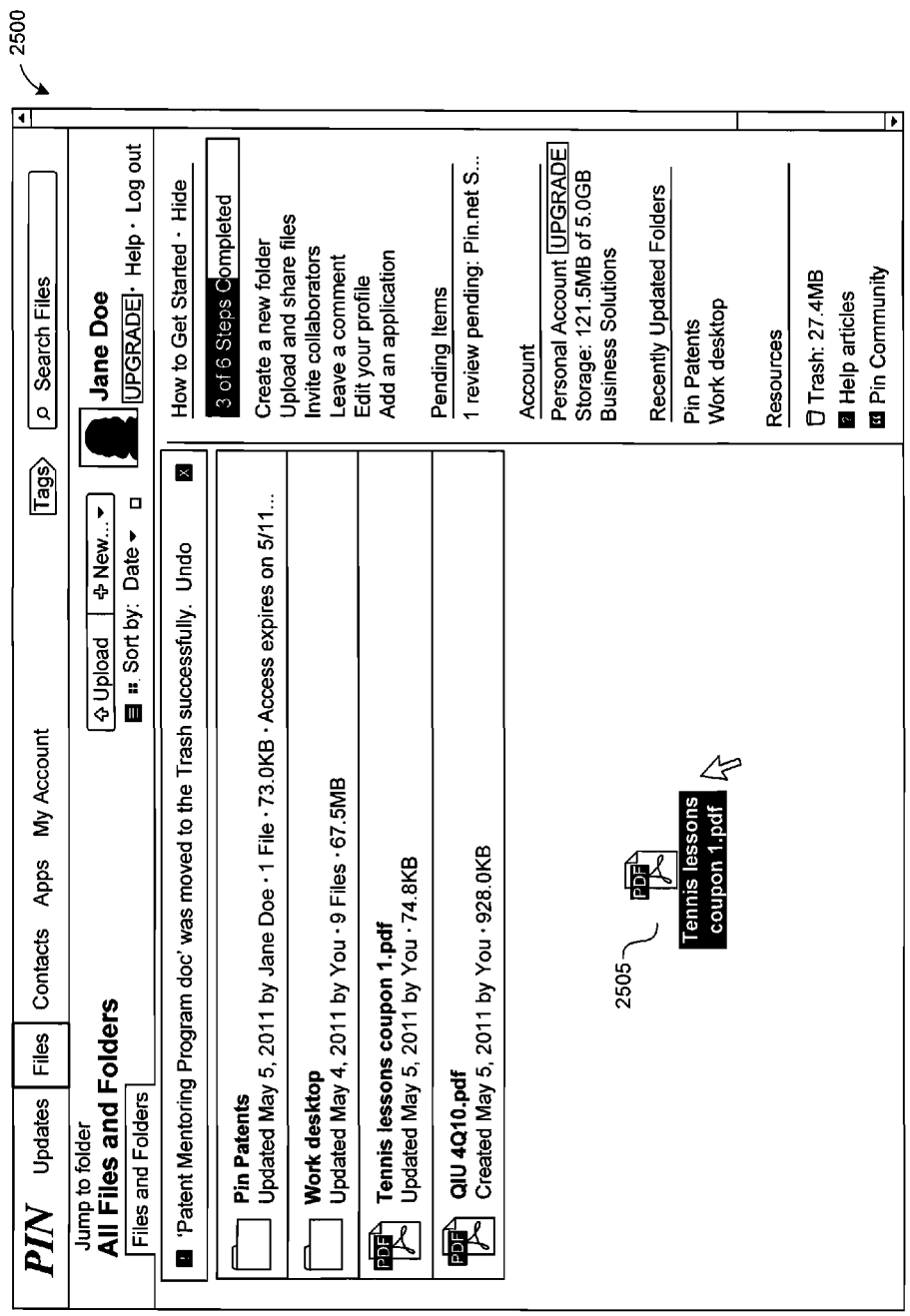
FIG. 25 depicts a screenshot showing an example of a user interface into which individual files or file icons can be dragged-and-dropped to initiate uploading.
Figure 26:
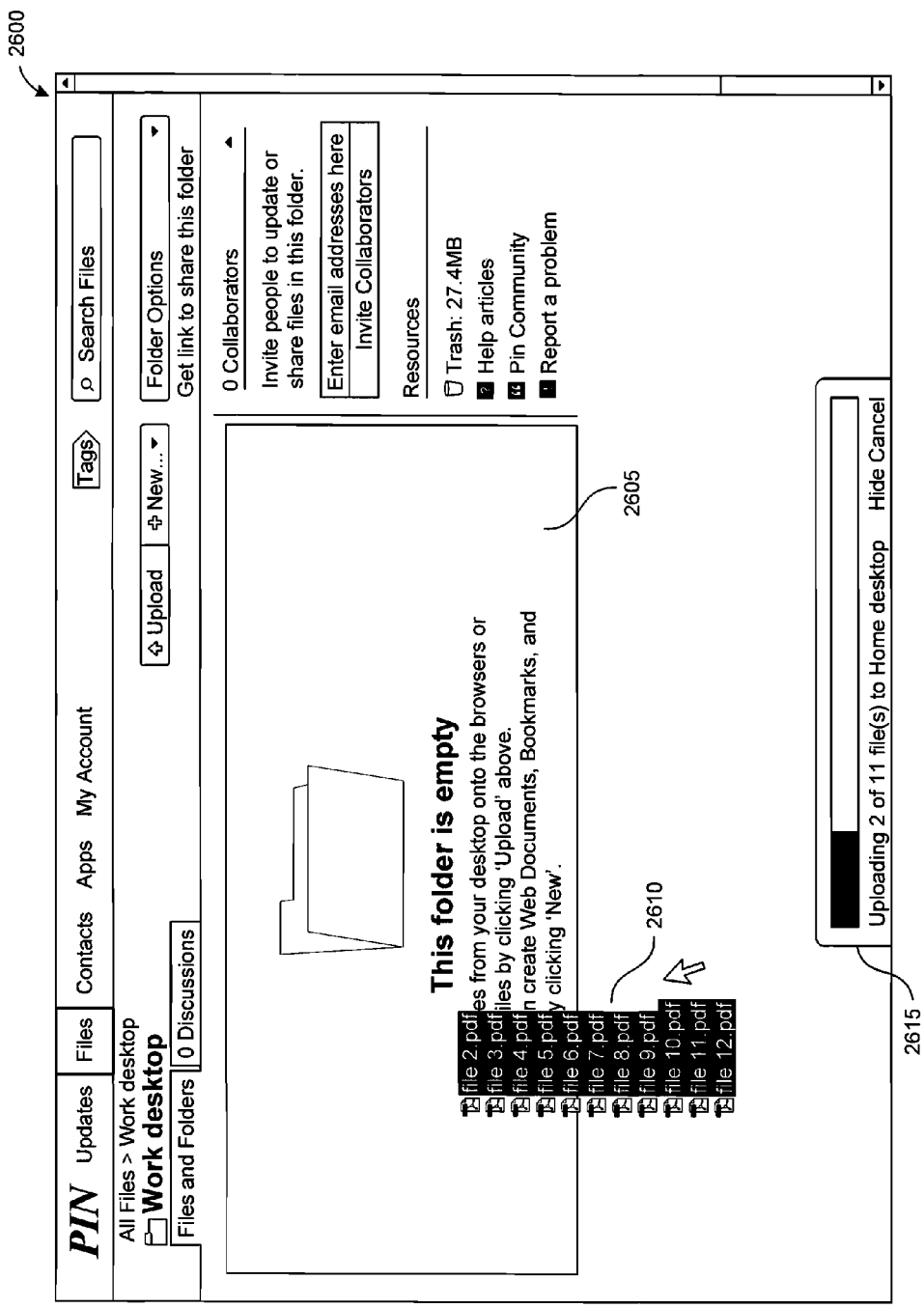
FIG. 26 depicts a screenshot showing an example of a user interface into which multiple files or file icons can be dragged-and-dropped to simultaneously initiate the uploading of the multiple files.
Figure 27:
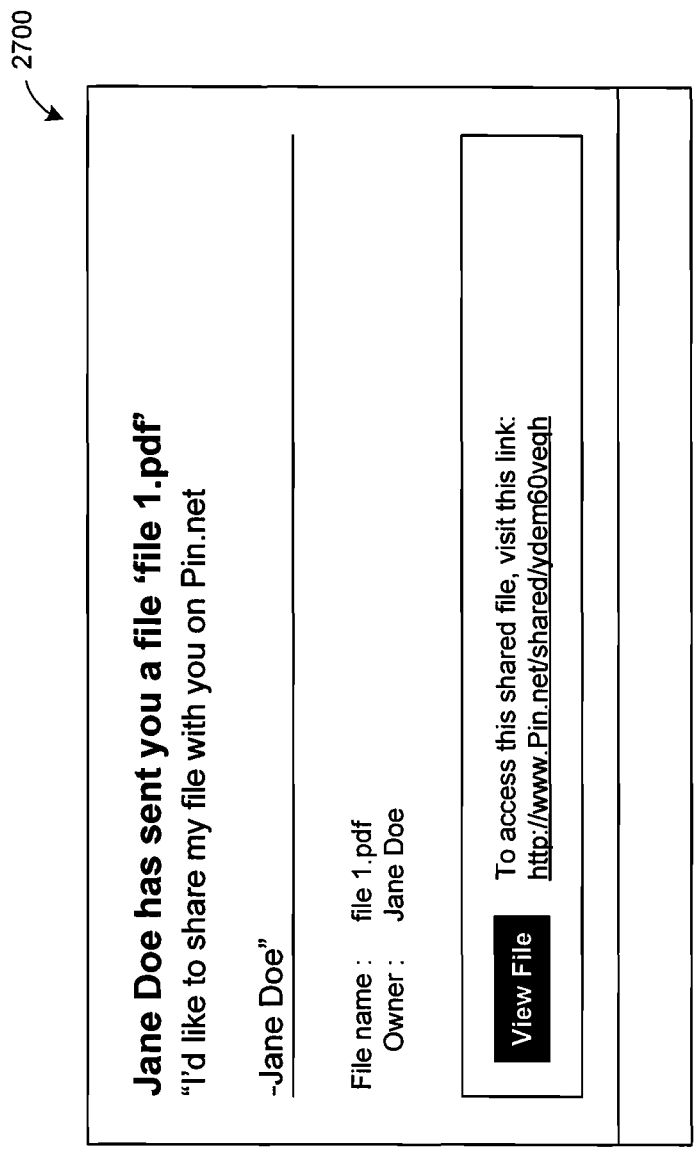
FIG. 27 depicts a screenshot showing an example of a notification of shared content.

FIG. 25 depicts a screenshot showing an example of a user interface 2500 into which individual files or file icons 2505 can be dragged-and-dropped to initiate uploading. FIG. 26 depicts a screenshot showing an example of a portion 2605 of a user interface 2600 into which multiple files or file icons 2610 can be dragged-and-dropped to simultaneously initiate the uploading of the multiple files. FIG. 27 depicts a screenshot showing an example of a notification 2700 of shared content.

Figure 28:
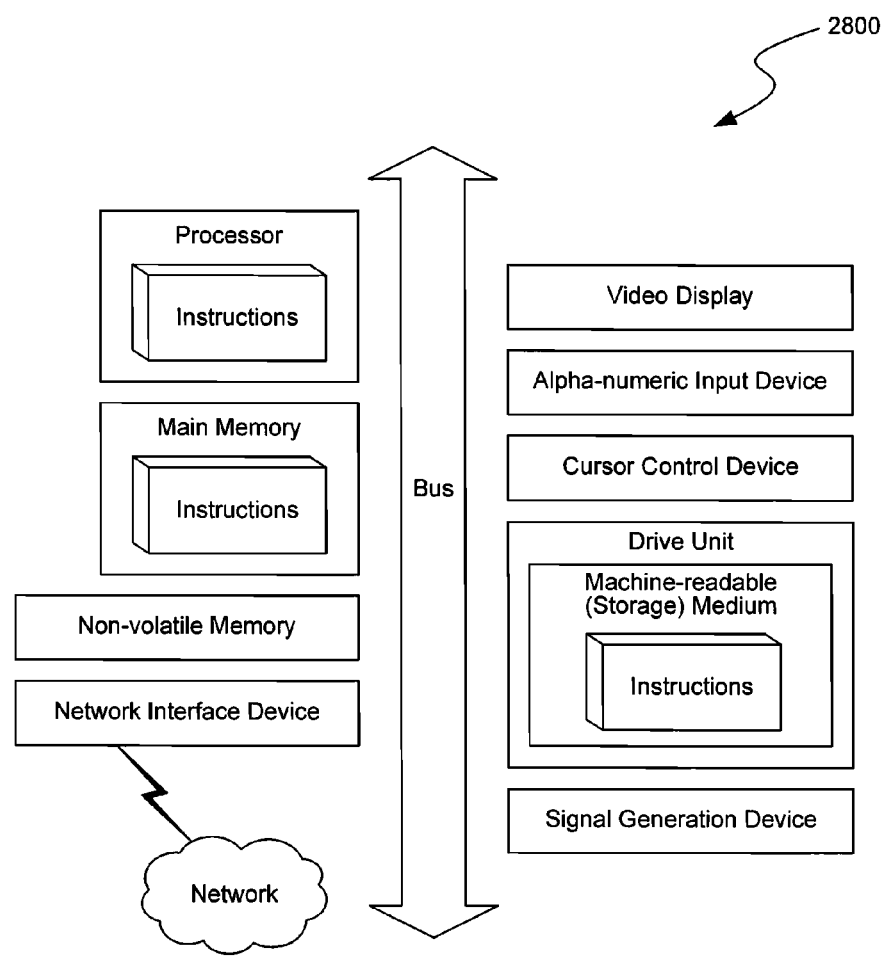
FIG. 28 shows a diagrammatic representation of a machine in the example form of a computer system within which a set of instructions, for causing the machine to perform any one or more of the methodologies discussed herein, may be executed.

FIG. 28 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method performed by a host server on a computing system for uploading content to the host server, the method, comprising:
   receiving, by the host server, an upload request from a user through a user interface of a web application to upload multiple items;
   wherein, the upload request is generated when a folder having the multiple items that is to be uploaded is identified through the user interface of the web application;
   wherein, the folder includes additional folders in a folder hierarchy of multiple items;
   determining, by the host server, whether the multiple items are acceptable for uploading to the host server;
   compressing the multiple items in the folder hierarchy in a single process into a single items and uploading the single item in a single upload process to the host server;
   parsing the single upload of the ingle item into individual files on the host server that were stored as the multiple items in the folder hierarchy;
   uploading the multiple items in the folder hierarchy based on a single request to upload the folder including the additional folders in the hierarchy;
   wherein, the uploading occurs in response to determining that the multiple items are acceptable for uploading to the server;
   wherein, the user is able to navigate away from the user interface of the web application to the host server through which the upload request was submitted prior to completion of the uploading by the host server of each of the multiple items to the host server.

2. The method of claim 1, wherein, the host server is a web server hosting an online collaboration environment.

3. The method of claim 1, wherein, the upload of the multiple items is not interrupted if the user accesses a link on the user interface causing another user interface to launch in a browser.

4. The method of claim 1, wherein, the upload of the multiple items continues if the user accesses a link on the user interface causing another user interface to launch in a browser.

5. The method of claim 1, further comprising,
   providing an item of the multiple items that has been uploaded to the host server available for access through the user interface, even when some of the multiple items have not yet been uploaded to the host server;
   wherein, the item that has been uploaded is available for access by the user and available to be shared with collaborators and accessed by the collaborators.

6. The method of claim 5, wherein, the item which has been uploaded to the host server is manipulable by the user through the user interface, without a need for browser refresh.

7. The method of claim 5, wherein, in accessing the item, the user is able to view, edit, preview, or comment on the item that has been uploaded, even prior to completion of uploading all of the multiple items.

8. The method of claim 5, further comprising, updating a feed stream to include an updated feed to indicate that the item has been uploaded to a collaboration environment hosted by the server.

9. The method of claim 8, wherein, the feed stream that is updated is for the user or collaborators of the user.

10. The method of claim 8, wherein, the feed stream is updated in real time or near real time relative to when the upload of the item completed.

11. The method of claim 1, further comprising, depicting in the user interface, a progress bar indicating upload progress of the upload request.

12. The method of claim 11, wherein, the progress bar is depicted even when the user navigates away from the user interface to another user interface during the upload process.

13. The method of claim 1, wherein, the upload request is generated via a drag-and-drop action of the multiple work items to be uploaded to the host server into a portion of the user interface.

14. The method of claim 1, wherein, the upload request is generated via a drag-and-drop action of a single folder containing the multiple work items to be uploaded to the host server into a portion of the user interface.

15. A method performed by a host server on a computing system for uploading content to the host server, the method, comprising:
 receiving, by the host server, an upload request from a user through a user interface of a web application to upload multiple items;
 determining, by the host server, whether the multiple items are acceptable for uploading to the host server;
 wherein, the upload request is generated when a folder having the multiple items that is to be uploaded is identified through the user interface of the web application;
 wherein, the folder includes additional folders in a folder hierarchy of the multiple items;
 uploading, by the host server, the multiple items in the folder hierarchy to the host server based on a single request to upload the folder including the additional folders in the folder hierarchy;
 wherein, uploading the multiple items comprises;
  compressing the multiple items in the folder hierarchy in a single process into a single item and uploading the single item in a single upload process; and
  parsing the single upload of the single item into individual files on the host server that were stored as the multiple items in the folder hierarchy; and
 wherein, the uploading occurs in response to determining that the multiple items are acceptable for uploading to the host server.

16. The method of claim 15, wherein, the user is able to navigate away from the user interface through which the upload request was submitted prior to completion of the uploading of each of the multiple items to the host server.

17. The method of claim 15, wherein, the upload request is generated via a drag-and-drop action of the folder containing the multiple work items to be uploaded to the host server into a portion of the user interface.

18. A method performed by a host server on a computing system for providing a notification of an upload to an online collaboration platform, the method, comprising:
 uploading, by the host server, multiple items to the host server of the online collaboration platform in response to receiving a upload request through a user interface of a web application to upload an item;
 wherein, the upload request is generated when a folder having the multiple items that is to be uploaded is identified through the user interface of the web application;
 wherein, the folder includes additional folders in a folder hierarchy;
 wherein, uploading the multiple items comprises:
  compressing the multiple items in the folder hierarchy in a single process into a single items and uploading the single item in a single upload process to the host server; and
  parsing the single upload of the single item into individual files on the host server that were stored as the multiple items in the folder hierarchy;
 wherein, the uploading occurs in response to determining that the multiple items are acceptable for uploading to the host server;
 selecting, by the host server, a recipient of a notification an activity according to criteria determined based on a workspace in which the upload was performed in the online collaboration platform; and
 updating, by the host server, a feed stream to include an updated feed which indicates that the item has been uploaded to the host server of the online collaboration platform.

19. The method of claim 18, wherein, the feed stream is updated in real time or near real time to when the activity occurred.

20. A server for uploading content, the server, comprising:
 a processor;
 memory having instructions stored thereon, which when executed by the processor causes the server to:
  receive an upload request from a user through a user interface of a web application;
  wherein, the upload request is generated when a folder having multiple that is to be uploaded is identified through the user interface of the web application;
  wherein, the folder includes additional folders in a folder hierarchy of multiple items;
  compress the multiple items in the folder hierarchy in a single process into a single item and upload the single item in a single upload process;
  parse the single upload of the single item into individual files that were stored as multiple items in the folder hierarchy;
  upload the multiple items in the folder hierarchy based on a single request to upload the folder including the additional folders in the folder hierarchy;
  wherein, the upload occurs in response to determining that the multiple items are acceptable for uploading; and
  provide an item of the multiple items that has been uploaded to the server available for access through the user interface, even when some of the multiple items have not yet been uploaded to the server.

21. The system of claim 20, wherein, the item which has been uploaded to the host server is manipulable by the user through the user interface, without a need for browser refresh.

22. The system of claim 20, wherein, in accessing the item, the user is able to view, edit, preview, or comment on the item that has been uploaded, even prior to completion of uploading all of the multiple items.

23. The system of claim 20, wherein, the user is able to navigate away from the user interface through which the upload request was submitted prior to completion of the uploading of each of the multiple items to the host server.

24. A system for uploading content to a host, the system, comprising:
 a memory;
 a module stored on the memory that is configured, when executed, to provide:
  means for, receiving an upload request from a user through a user interface of a web application;
  wherein, the upload request is generated when a folder having the multiple items that is to be uploaded is identified through the user interface of the web application;

wherein, the folder includes additional folders in a folder hierarchy of multiple items;

means for, determining whether the multiple items are acceptable for uploading to the host server;

means for, compressing the multiple items in the folder hierarchy in a single process into a single item and uploading the single item in a single upload process to the host server;

means for, parsing the single upload of the single item into individual files on the host server that were stored as the multiple items in the folder hierarchy;

means for, uploading the multiple items in the folder hierarchy based on a single request to upload the folder including the additional folders in the folder hierarchy; and means for, providing an item of the multiple items that has been uploaded to the host available for access through the user interface, even when some of the multiple items have not yet been uploaded to the host.

* * * * *